(12) United States Patent
Kim et al.

(10) Patent No.: US 10,142,821 B2
(45) Date of Patent: Nov. 27, 2018

(54) WIRELESS COMMUNICATION BETWEEN DEVICES THAT USE DIFFERENT WIRELESS PROTOCOLS

(71) Applicant: Regents of the University of Minnesota, Minneapolis, MN (US)

(72) Inventors: Song Min Kim, Minneapolis, MN (US); Tian He, Arden Hills, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 227 days.

(21) Appl. No.: 15/066,798

(22) Filed: Mar. 10, 2016

(65) Prior Publication Data

US 2016/0269971 A1 Sep. 15, 2016

Related U.S. Application Data

(60) Provisional application No. 62/131,080, filed on Mar. 10, 2015, provisional application No. 62/297,467, filed on Feb. 19, 2016.

(51) Int. Cl.
*H04W 4/80* (2018.01)
*H04W 16/14* (2009.01)
*H04W 48/12* (2009.01)
*H04W 72/12* (2009.01)
*H04W 84/12* (2009.01)
*H04W 80/02* (2009.01)

(52) U.S. Cl.
CPC ............ *H04W 4/80* (2018.02); *H04W 16/14* (2013.01); *H04W 48/12* (2013.01); *H04W 72/1215* (2013.01); *H04W 80/02* (2013.01); *H04W 84/12* (2013.01)

(58) Field of Classification Search
CPC ... H04W 40/244; H04W 16/14; H04W 4/008; H04W 48/12; H04W 72/005; H04W 72/1215; H04W 84/12; H04W 80/02
See application file for complete search history.

(56) References Cited

U.S. PATENT DOCUMENTS

2007/0254596 A1* 11/2007 Corson ............... H04W 76/023 455/68
2009/0147768 A1* 6/2009 Ji .......................... H04J 3/0664 370/350

(Continued)

OTHER PUBLICATIONS

Balasubramanian et al., "Energy Consumption in Mobile Phones: A Measurement Study and Implications for Network Applications," ACM, Internet Measurement Conference 2009, Nov. 4-6, 2009, 16 pp.

(Continued)

*Primary Examiner* — Ayaz R Sheikh
*Assistant Examiner* — Hai-Chang Hsiung
(74) *Attorney, Agent, or Firm* — Shumaker & Sieffert, P.A.

(57) ABSTRACT

Techniques of this disclosure include modulating messages by shifting the timing of periodic beacon frames already mandatory for certain wireless protocols without incurring extra traffic. Such a band-free design allows continuous broadcast from a first computing device to reach a second computing device operating on a different wireless protocol than the first wireless protocol. Further techniques of this disclosure enable concurrent broadcasts from multiple computing devices or boost the transmission rate of a computing device.

35 Claims, 19 Drawing Sheets

(56) References Cited

U.S. PATENT DOCUMENTS

| | | | |
|---|---|---|---|
| 2011/0243110 A1 | 10/2011 | Dean et al. | |
| 2012/0328061 A1* | 12/2012 | Chow | H04W 56/0015 375/354 |
| 2013/0235773 A1* | 9/2013 | Wang | H04W 52/0206 370/311 |
| 2013/0259019 A1* | 10/2013 | Karaoguz | H04W 88/06 370/338 |

OTHER PUBLICATIONS

Cao et al, "L2: Lazy Forwarding in Low Duty Cycle Wireless Sensor Networks," Proceedings IEEE InfoCom 2012, Mar. 25-30, 2012, 9 pp.

Carbonelli et al., "M-PPM Noncoherent Receivers for UWB Applications," IEEE Transactions on Wireless communications, vol. 5 No. 8, Aug. 2006, 13 pp.

Carroll et al., "Continua: An Interoperable Personal Healthcare Ecosystem," Pervasive Computing, Standards & Emerging Technologies, Oct.-Dec. 2007, 6 pp.

Ghassemlooy et al., "Digital Pulse Interval Modulation for Optical Communications," IEEE Communications Magazine, WDM Fiber Optic Communications, vol. 36, No. 12, Dec. 1998, 7 pp.

D'Amico et al., "Energy-Detection UWB Receivers with Multiple Energy Measurements," IEEE Transactions on Wireless Communications, vol. 6, No. 7, Jul. 2007, 10 pp.

Ding et al., "Characterizing and Modeling the Impact of Wireless Signal Strength on Smartphone Battery Drain," Sigmetrics 2013, Proceedings of the 2013 ACM Sigmetrics International Conference on Measurement and Modeling of computer Systems, Jun. 17-21, 2013, 15 pp.

Gollakota et al., Clearing the RF Smog: Making 802.11 Robust to Cross-Technology Interference, Proceedings of SIGCOMM 2011 and Best Papers Co-Located Workshops, ACM, vol. 41, No. 4, Oct. 2011, 15 pp.

Hao et al., WizSync: Exploiting Wi-Fi Infrastructure for Clock Synchronization in Wireless Sensor Networks, IEEE 32nd Real-Time Systems Symposium, Nov. 29-Dec. 2, 2011, 12 pp.

Hsu et al., "Coexistence Wi-Fi MAC Design for Mitigating Interference Caused by Collocated Bluetooth," IEEE Transactions on Computers, vol. 64, No. 2, Feb. 2015, 11 pp.

Jin et al., "WiZi-Cloud: Application-transparent Dual ZigBee-Wifi Radios for Low Power Internet Access," IEEE InfoCom 2011, Apr. 10-15, 2011, 9 pp.

Kim et al., "FreeBee: Cross-technology Communication via Free Side-channel," Proceedings of the 21st Annual International Conference on Mobile Computing and Networking, Sep. 7-11, 2015, 14 pp.

Li et al., "WiBee: Building WiFi Radio Map with ZigBee Sensor Networks," 31st Annual IEEE International Conference on Computer Communications: Mini-Conference, Mar. 25-30, 2012, 5 pp.

Wirtz et al., "A Wireless Application Overlay for Ubiquitous Mobile Multimedia Sensing and Interaction," MMSys, ACM, Mar. 14-21, 2014, 12 pp.

Li et al., "Towards Energy-Fairness in Asynchronous Duty-Cycling Sensor Networks," ACM Transactions on Sensor Networks, vol. 10, No. 3, Article 38, Apr. 2014, 26 pp.

Chebrolu et al., "Esense: Communication through Energy Sensing," MobiCom'09, Sep. 20-25, 2009, 12 pp.

\* cited by examiner

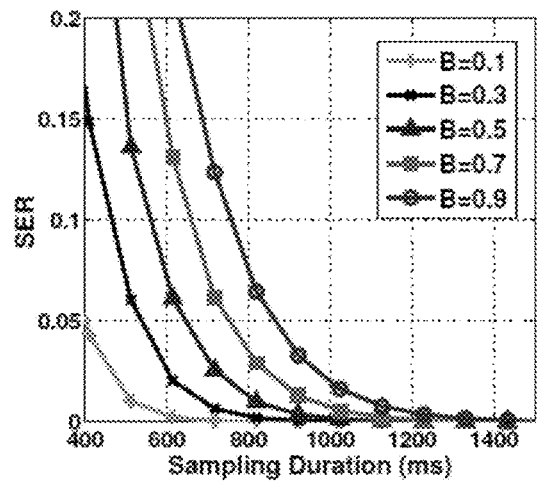 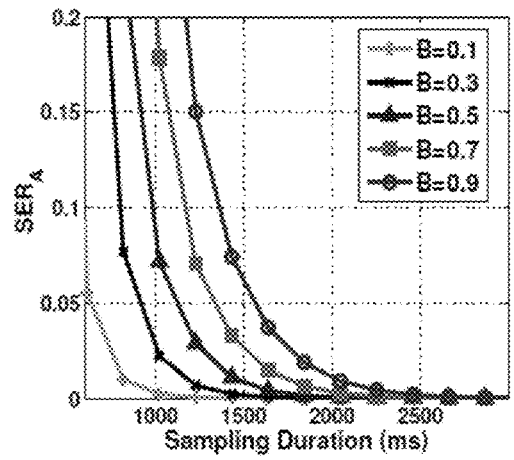
FIG. 15A  FIG. 15B
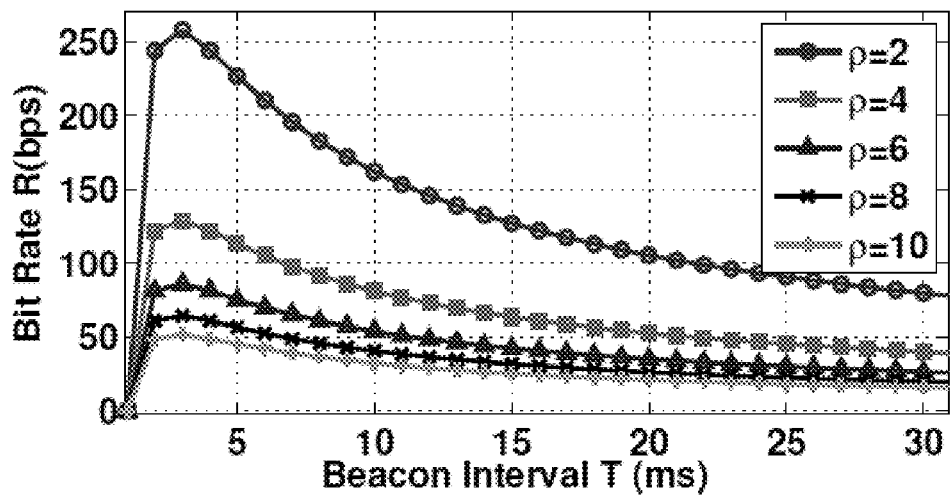
FIG. 16

WIRELESS COMMUNICATION BETWEEN DEVICES THAT USE DIFFERENT WIRELESS PROTOCOLS

This provisional application claims priority to U.S. Provisional Application No. 62/131,080, filed Mar. 10, 2015, and U.S. Provisional Application No. 62/297,467, filed Feb. 19, 2016, where the content of each is incorporated herein in their entirety.

GOVERNMENT INTEREST

This invention was made with government support under CNS-0917097 awarded by the National Science Foundation. The government has certain rights in the invention.

TECHNICAL FIELD

The disclosure relates to wireless communication between devices.

BACKGROUND

The unprecedented proliferation of wireless era throughout the last decade was led by multiple wireless technologies, each offering convenience in different aspects of daily life. However, wireless technologies are victims of their own success: Spectrum sharing among incompatible wireless technologies has led to severe wireless coexistence problem.

SUMMARY

In one example, a method is described comprising receiving, by a first computing device, one or more signals that are output by a second computing device, wherein the first computing device is configured to process the one or more signals according to a first wireless protocol, and wherein the one or more signals are associated with a second wireless protocol, determining, by the first computing device, a reference beacon interval associated with a plurality of beacons identified in the one or more signals, wherein the reference beacon interval is based at least in part on an amount of time between a first beacon of the plurality of beacons and a second beacon of the plurality of beacons, determining, by the first computing device, an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval, and determining, by the first computing device, a message that is based at least in part on the adjusted beacon interval.

In another example, a method is described comprising determining, by a first computing device, a message to be sent to a second computing device, and outputting, by the first computing device, one or more signals, the first computing device being configured to output the one or more signals according to a first wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval.

In another example, a system is described comprising a first computing device configured to: determine a message to be broadcast, and output one or more signals according to a first wireless protocol, the first computing device being configured to output the one or more signals according to a first wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval. The system further comprises a second computing device configured to receive the one or more signals according to the second wireless protocol, determine the reference beacon interval, determine the adjusted beacon interval, and determine the message based at least in part on the adjusted beacon interval.

In another example, a computing device is described comprising a wireless radio configured to send and receive signals via a first wireless protocol, at least one processor, and a storage device configured to store one or more modules operable by the at least one processor to: determine a message to be sent to a second computing device, and output one or more signals via the wireless radio, the wireless radio being configured to output the one or more signals according to the first wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the wireless radio is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval.

In another example, a computing device is described comprising a wireless radio configured to send and receive signals via a first wireless protocol, at least one processor, and a storage device configured to store one or more modules operable by the at least one processor to: receive one or more signals that are output by a second computing device, wherein the first computing device is configured to process the one or more signals according to the first wireless protocol, and wherein the one or more signals are associated with a second wireless protocol, determine a reference beacon interval associated with a plurality of beacons identified in the one or more signals, wherein the reference beacon interval is based at least in part on an amount of time between a first beacon of the plurality of beacons and a second beacon of the plurality of beacons, determine an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval, and determine a message that is based at least in part on the adjusted beacon interval.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 15A-15B are graphs depicting SER vs. sampling duration when $$B_f = \frac{B}{6},$$

$B_b$=0.9, $\lambda$=800, in accordance with one or more techniques of the current disclosure.

FIG. 16 is a graph depicting Bit rate vs. beacon interval for different $\rho$, accordance with one or more techniques of the current disclosure.

Figure 17:
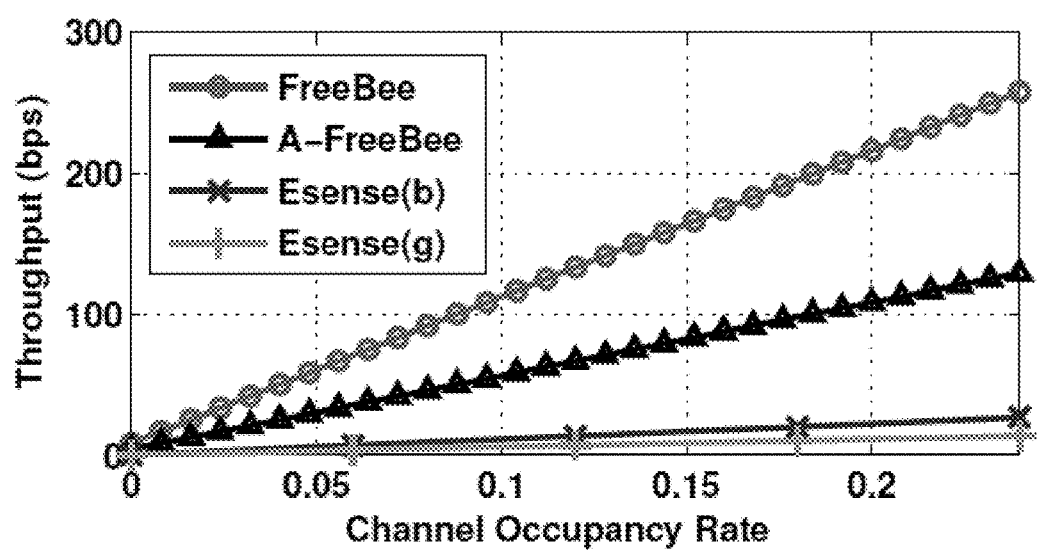

FIG. 17 is a graph depicting a throughput comparison, in accordance with one or more techniques of the current disclosure.

Figure 18A:
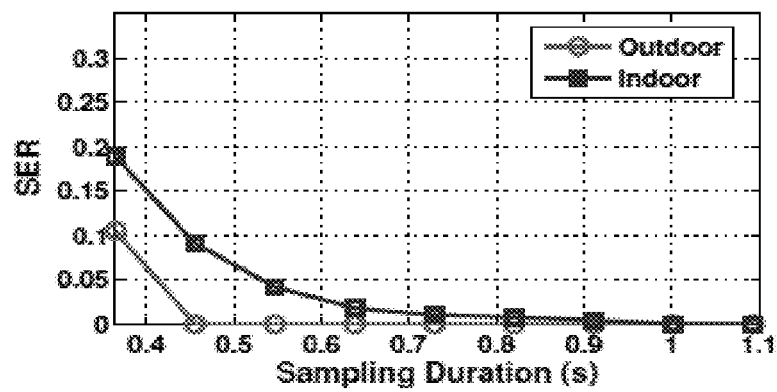
Figure 18B:
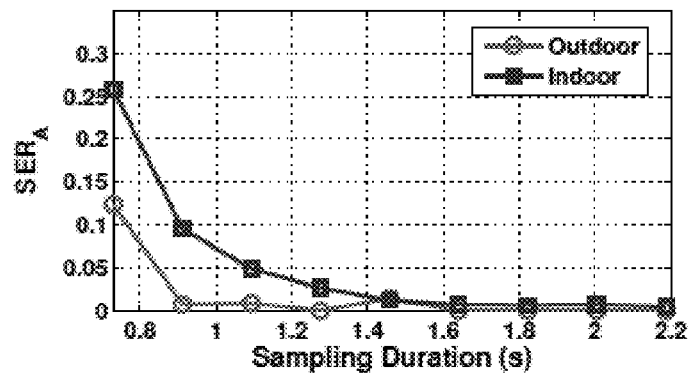
Figure 18C:
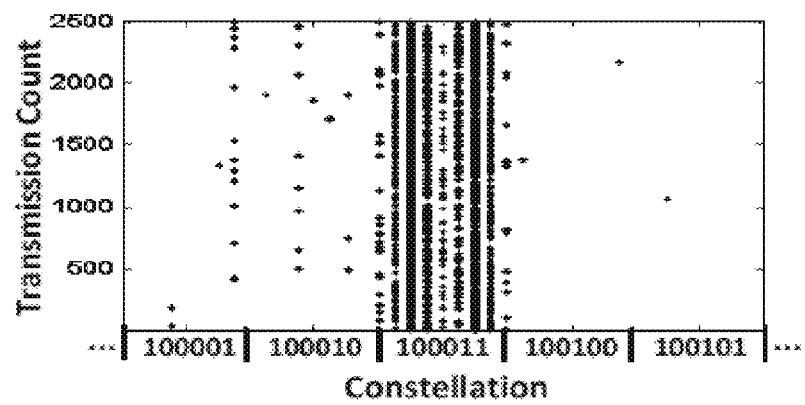

FIGS. 18A-18C are graphs depicting indoor and outdoor performances of (a) FreeBee and (b) A-FreeBee when T=89 ms. Due to less noise outdoors, both FreeBee and A-FreeBee quickly reach near-zero SER at $\rho$=5, whereas indoor environment required $\rho$=9. (c) shows where the received messages are positioned when a symbol of '100011' was sent 2,500 times, in accordance with one or more techniques of the current disclosure.

Figure 19A:
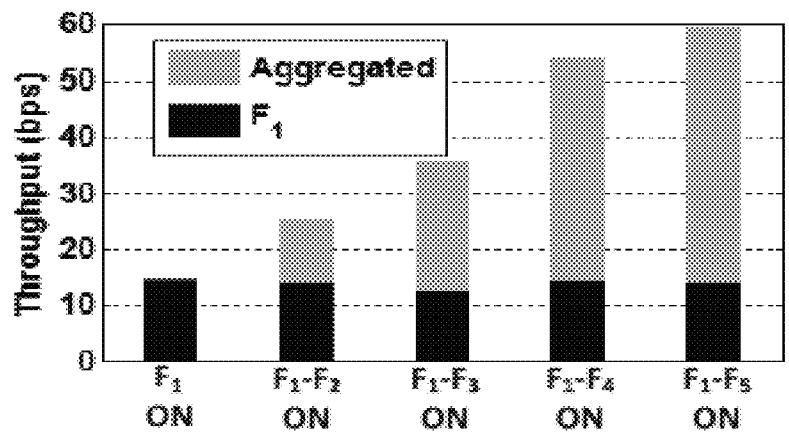
Figure 19B:
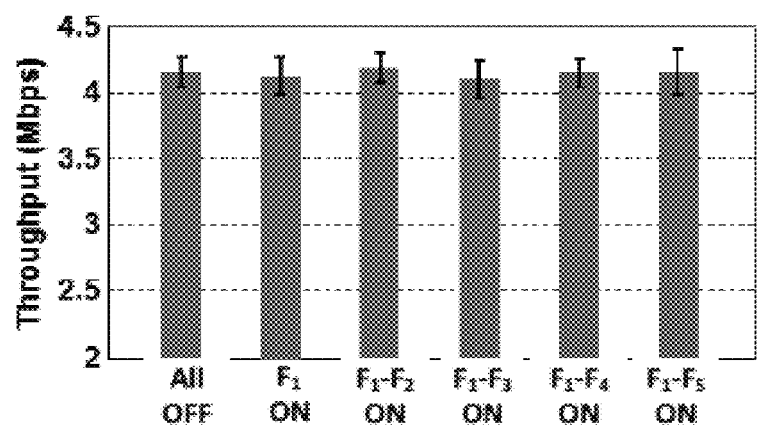
Figure 19C:
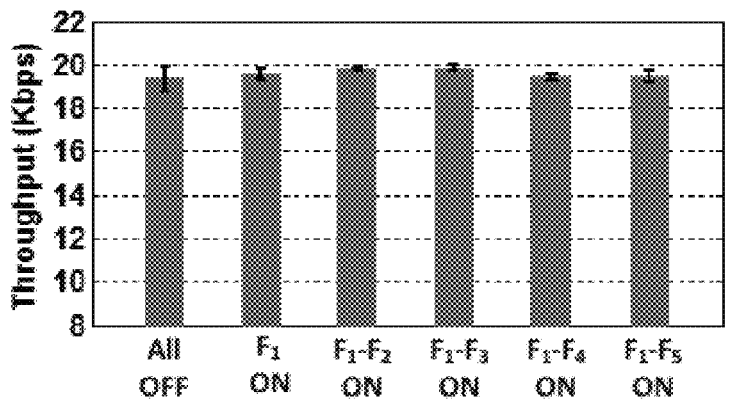

FIGS. 19A-19C are graphs depicting transparency of FreeBee to (a) concurrent FreeBee messages, (b) WiFi, and (c) ZigBee, in accordance with one or more techniques of the current disclosure.

Figure 20:
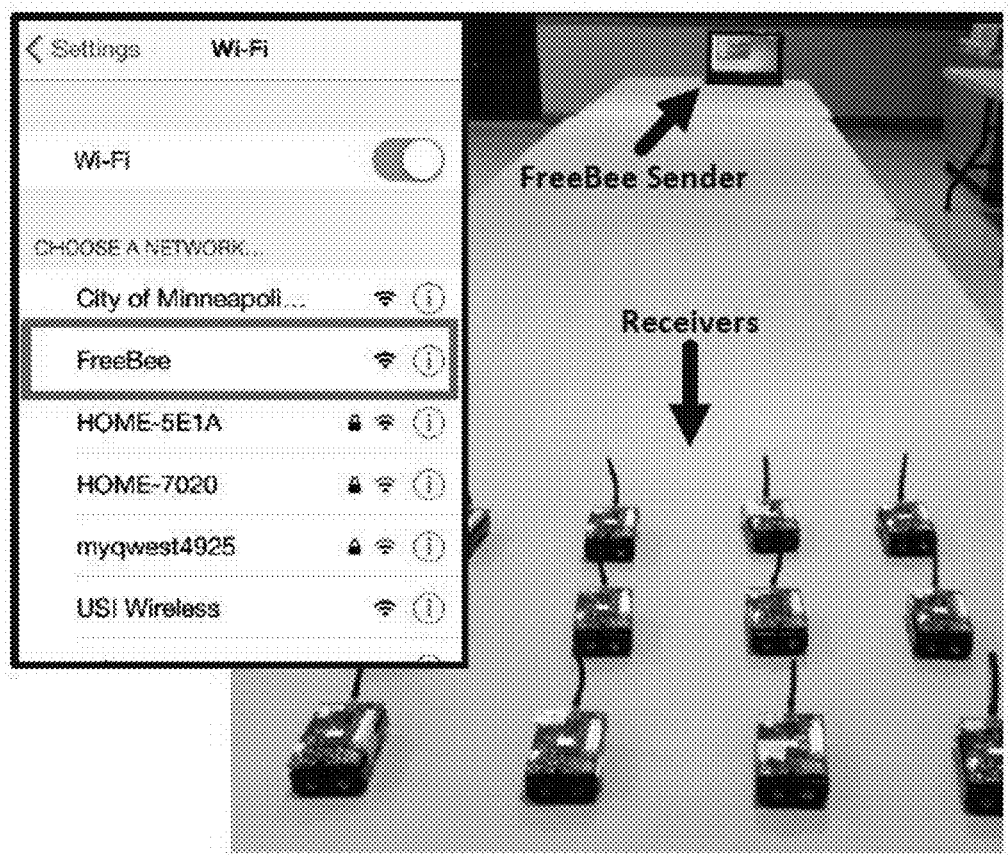

FIG. 20 is a conceptual diagram depicting an experimental setup, in accordance with one or more techniques of the current disclosure.

Figure 21A:
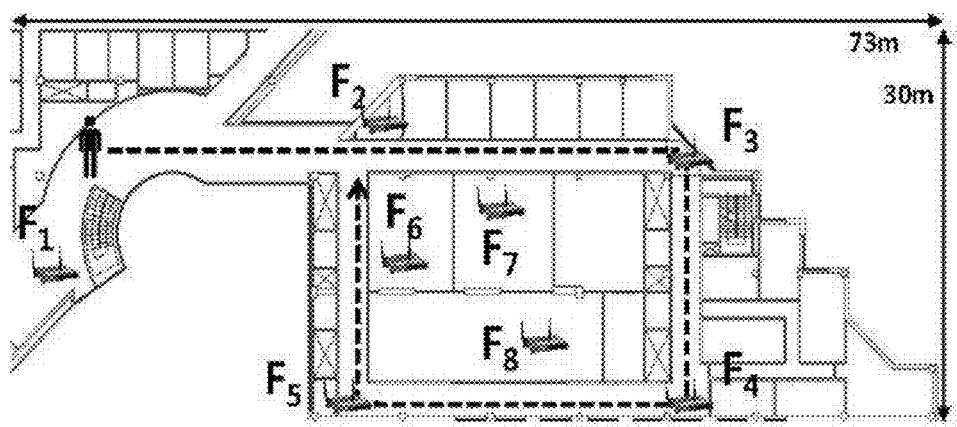
Figure 21B:
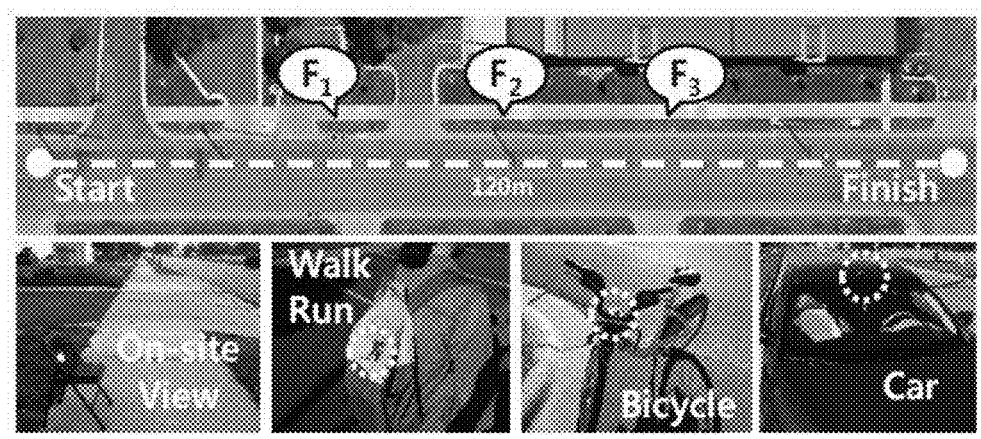
Figure 22A:
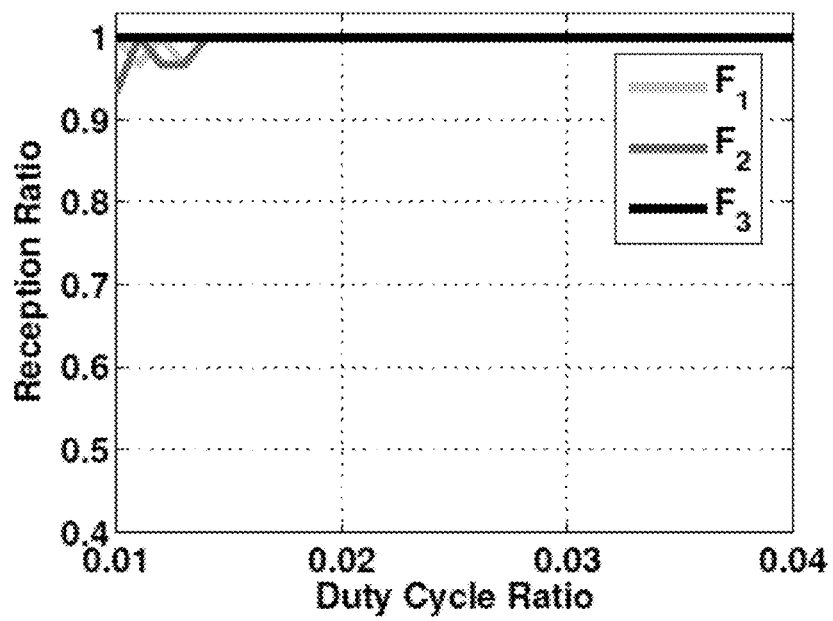
Figure 22B:
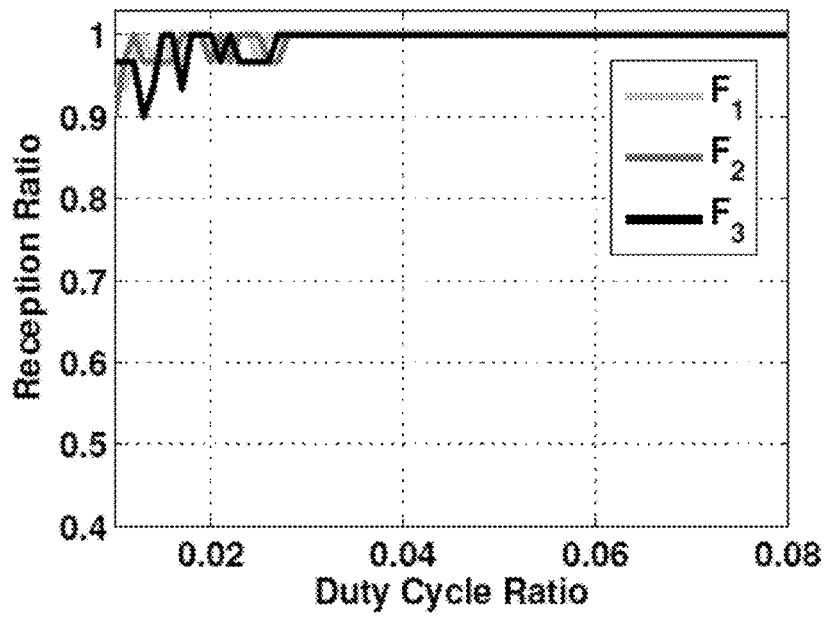
Figure 22C:
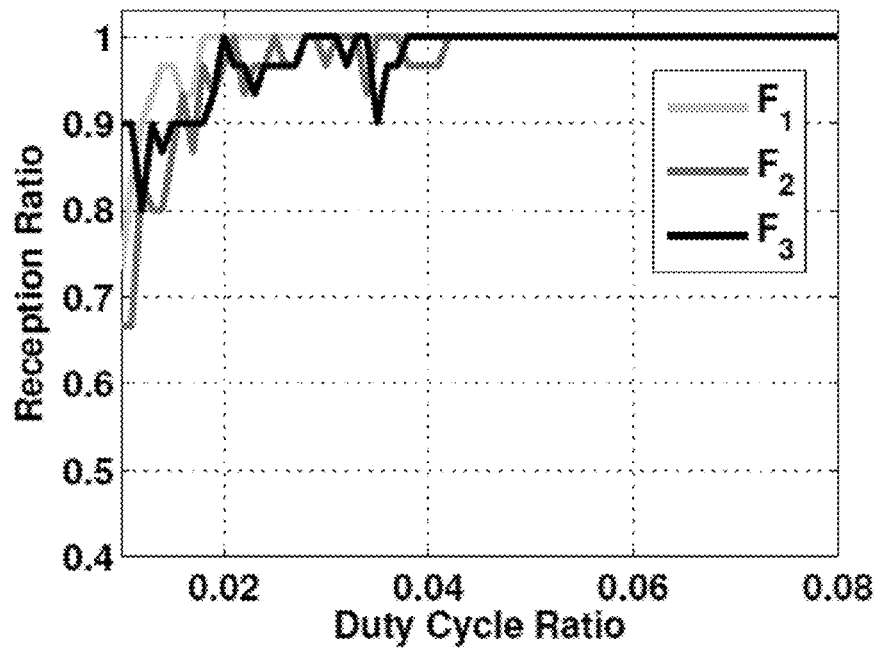
Figure 22D:
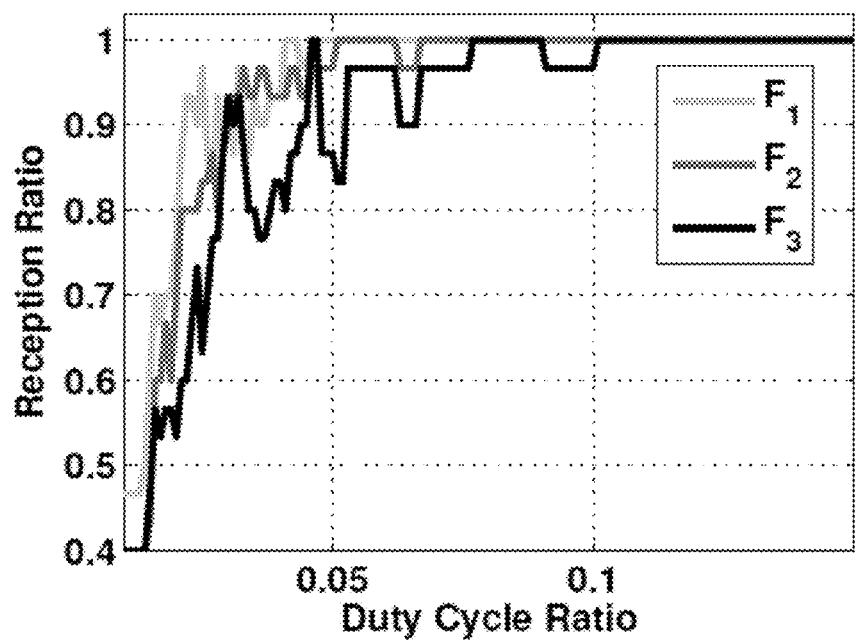

FIGS. 21A-21B are conceptual diagrams depicting a mobile scenario evaluation, experimentally revealing the impact of mobility on FreeBee on both indoor and outdoor scenarios, when the receivers are duty-cycled, in accordance with one or more techniques of the current disclosure.

FIGS. 22A-22D are graphs depicting, when walking, running, riding bicycle and car, reception can be ensured with duty cycling of only 1.5%, 3%, 5% and 10%, respectively, in accordance with one or more techniques of the current disclosure.

Figure 23A:
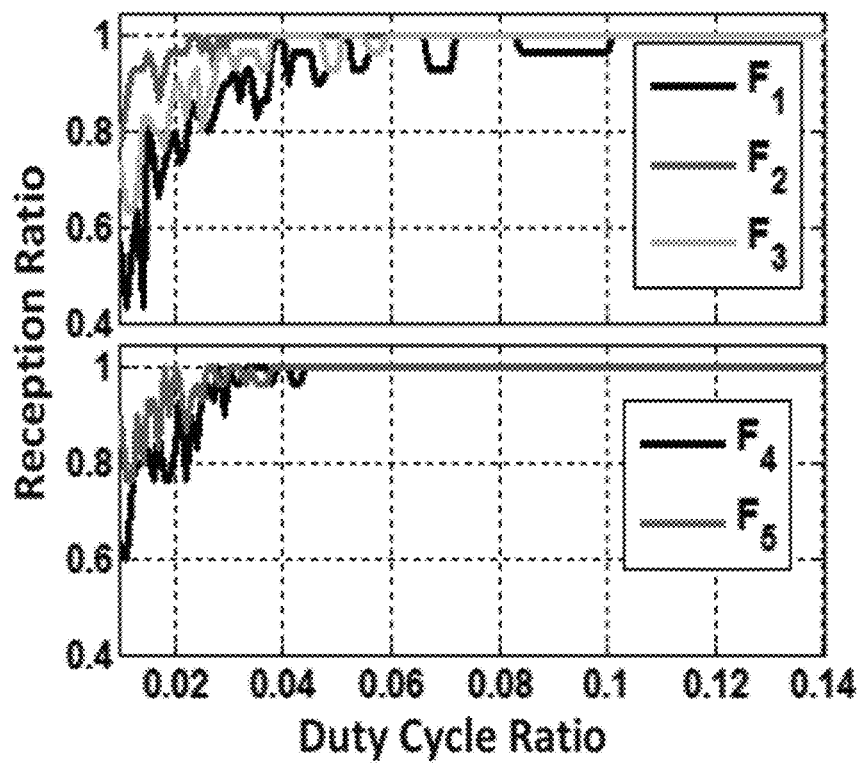
Figure 23B:
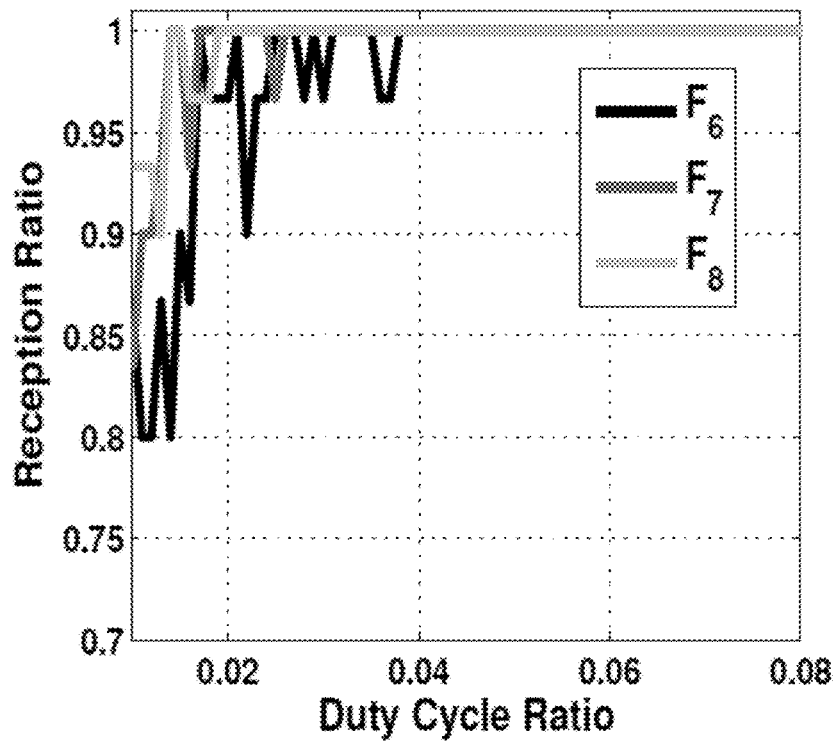

FIGS. 23A-23B are graphs depicting, when walking at a regular speed in a university building, duty cycling of 10% guarantees reception even when blocked by walls, in accordance with one or more techniques of the current disclosure.

Figure 24A:
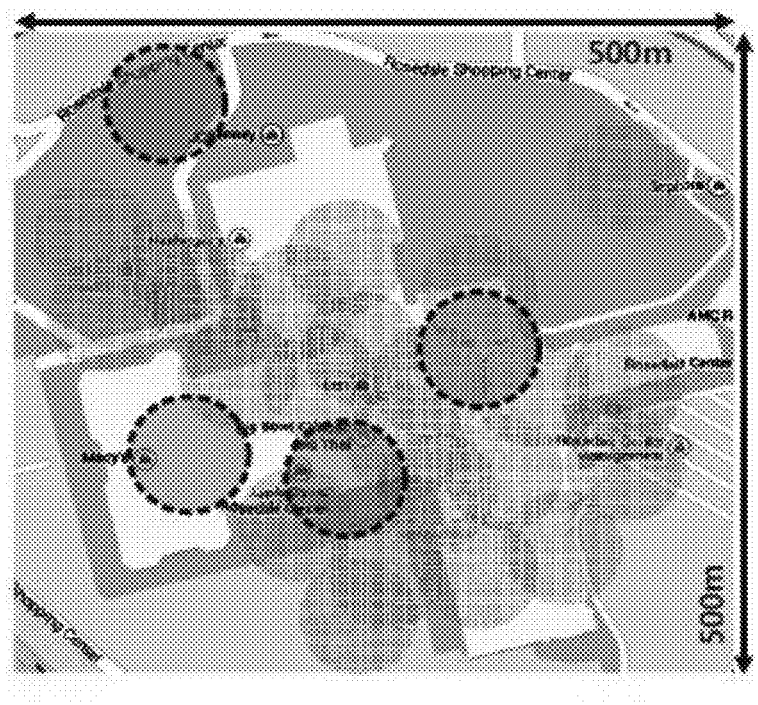

FIG. 24A is a conceptual diagram depicting private and open WiFi zones that are marked as light-gray and dark-gray (outlined) circles in a mall area.

Figure 24B:
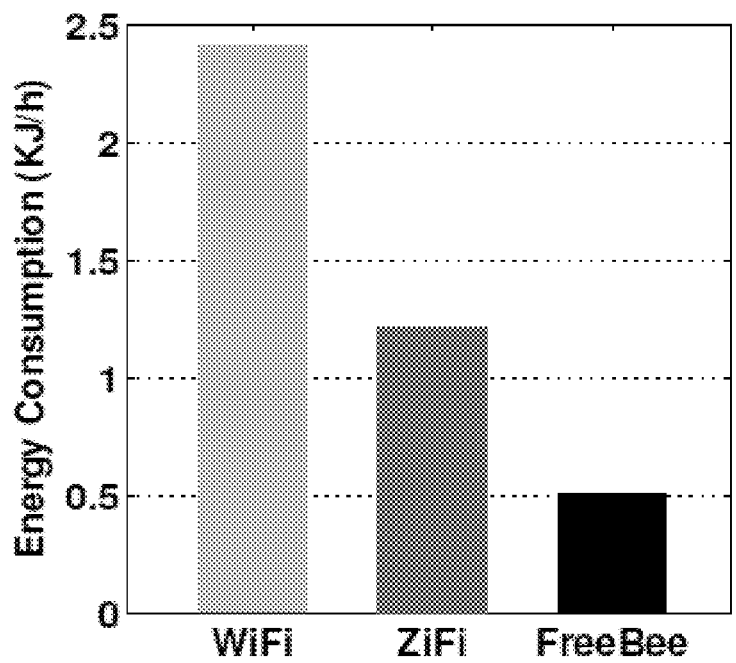

FIG. 24B shows the energy consumed for WiFi connection in the area. FreeBee saves 78.9% of energy, in accordance with one or more techniques of the current disclosure.

Figure 25:
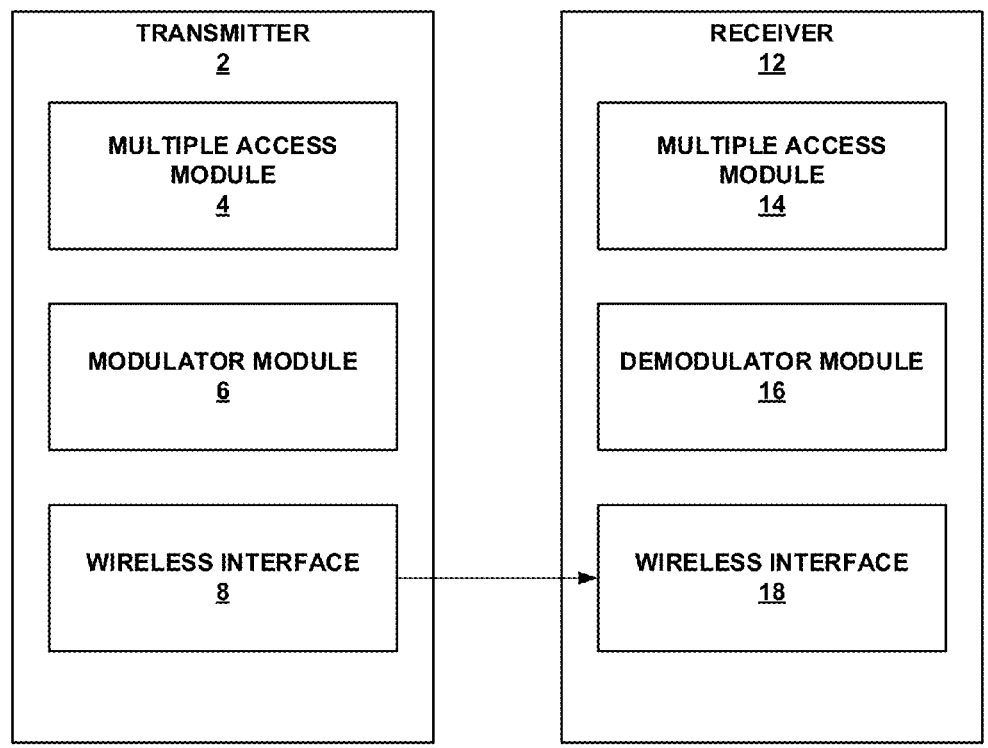

FIG. 25 is a block diagram of a transmitter device and a receiver device that may be configured to perform one or more techniques in accordance with the current disclosure.

Figure 26:
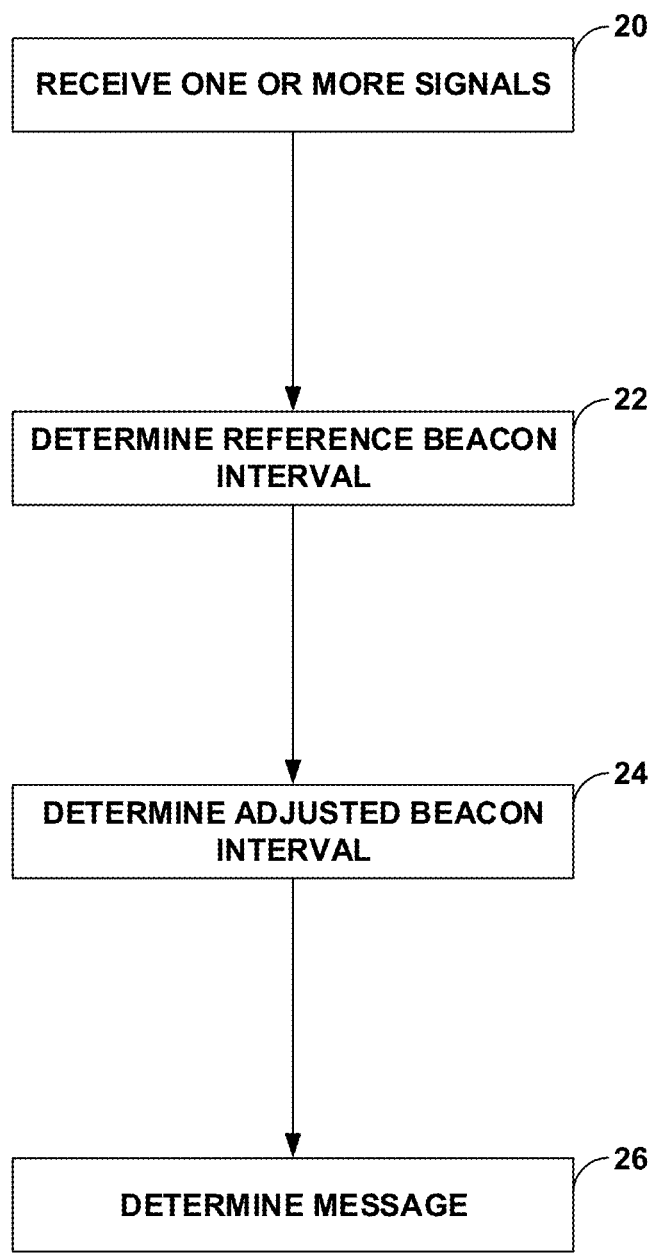

FIG. 26 is a flow diagram of one or more techniques of the current disclosure.

Figure 27:
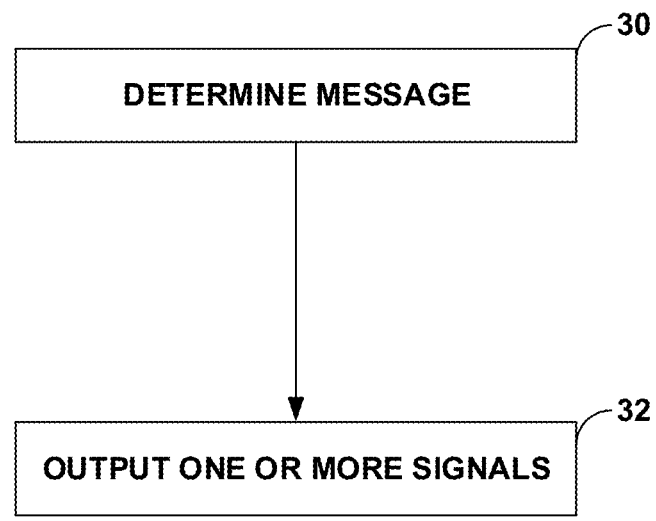

FIG. 27 is a flow diagram of one or more techniques of the current disclosure.

DETAILED DESCRIPTION

In general, this disclosure describes a communication framework that aims to allow coexistence of multiple wireless protocols in the form of mutual supplementation. Extensive testbed experiments reveals that techniques described herein offer a reliable message delivery within a short amount of time. The unique band-free design allows techniques described herein to exhibit strong support for highly mobile implementations, such as in a car, and extremely duty cycled (≤5%) receivers, implying applicability to a wide range of practical applications. Inspecting through the real WiFi deployment patterns in a shopping mall area, it is observed that techniques described herein can save up to 78.9% of the energy otherwise wasted by the WiFi interface.

Techniques described herein are double sided. As previously known it is detrimental on one side as it may cause inefficiency and unfairness in channel/spectrum utilization. At the same time, on the other side, it also reveals opportunity; the standards are specialized and hence possess strength in different areas, which are often the weakness of the other. For example, while WiFi have access to virtually unlimited amount of information via the Internet, it consumes considerable amount of power causing battery problems in mobile devices. Conversely, ZigBee network often operates as stand-alone and has limited information, but is extremely energy efficient. Thus, both networks can be enhanced in the form of mutual supplementation, enlightening the bright side of coexistence.

In this disclosure, techniques described herein (hereinafter, "FreeBee") describe an inter-technology communication framework between WiFi and ZigBee, that is transparent and band-free. The techniques described herein aim to not only mitigate the detrimental effect of coexistence, but also explore the opportunity behind it. In other words, FreeBee addresses CTI (Cross Technology Interference), and at the same time it enables cooperation via communication to benefit both sides. The techniques described herein achieve this via embedding message into WiFi beacons, specifically by shifting the timings of the beacons. Although the concept of modulating via signal position is known as PPM (Pulse Position Modulation), the precise timing requirement makes legacy PPM designs ineffective in the presence of wireless coexistence and also PPM does not support intertechnology communication. Other cutting-edge inter-technology communication works require dedicated packets for communication, burdening already-crowded channel with further overhead. The techniques described herein provide (i) an exclusive band-free design, (i) the support for interval multiplexing and (iii) transparency to legacy wireless systems.

Yet another advantage of the techniques described herein is its wide applicability to any platform that utilizes periodic messages. For instance, with periodic beaconing introduced in recent Bluetooth 4.0 standard, FreeBee can be used to exploit communication between Bluetooth and other networks sharing the same band including, but not limited to, WiFi and ZigBee. In summary, the techniques described herein are three fold:

A communication framework between different wireless protocols, named FreeBee, that does not introduce additional/dedicated traffic. The techniques described herein are assisted by multiplexing scheme for concurrent transmission and reception of multiple signals.

The techniques described herein show the effectiveness of both theoretically and empirically via prototype implementation. The results suggest that FreeBee offers a reliable message delivery within less than a second, with a strong support for mobility up to 30 mph and duty cycle operation of less than 5%.

The techniques described herein demonstrate a practical application that can largely benefit from the design. Inspecting through the real WiFi deployment patterns in a shopping mall area, it is observed that FreeBee can save up to 78.9% of the energy otherwise wasted by the WiFi interface.

Motivation:

This section demonstrates that direct communication between the WiFi and ZigBee can benefit both sides.

Benefit to ZigBee—Services made more practical: By connecting to Internet, WiFi can access valuable information such as geolocation, spectrum white space, and user availability. However since the information has been kept exclusive to WiFi, other technologies such as ZigBee cannot benefit from these information without assistance from costly dual-radio gateways, which mostly unavailable in real-life settings.

Figure 1A:
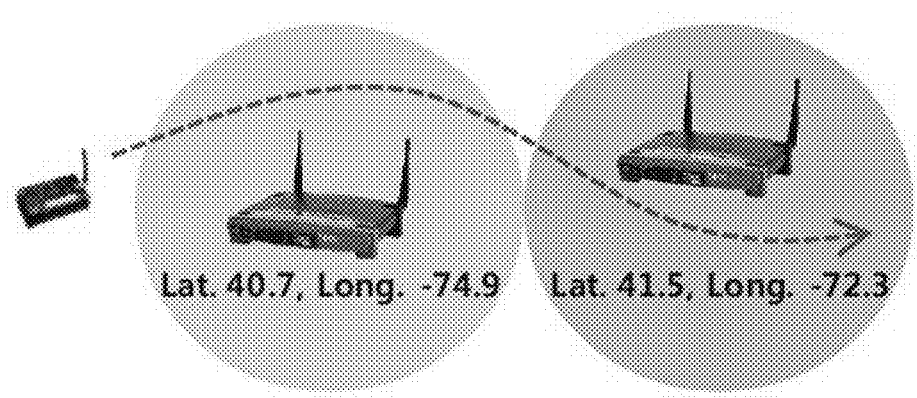
FIGS. 1A-1B are conceptual diagrams depicting a system that enhances ZigBee services through direct information sharing from WiFi APs, in accordance with one or more techniques of the current disclosure.
Figure 1B:
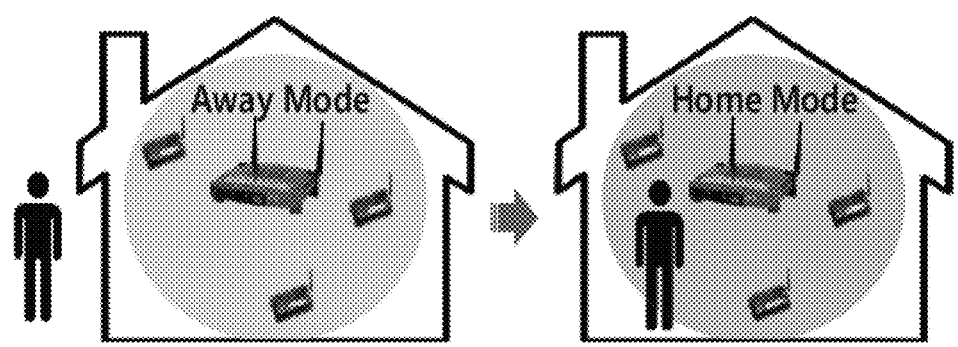

The techniques described herein allow ZigBee nodes to acquire useful information directly from WiFi, which largely simplifies ZigBee applications, or even realize the services that were not possible before. For examples, FIG. 1(a) shows by obtaining position information from WiFi AP, ZigBee networks can provide various location-based services such as object tracking and location-aware mobile sensing. FIG. 1(b) demonstrates an example of context-aware service in home automation. When the resident is away, it can be detected by the home WiFi AP since his/her smart phone is no longer associated to it. With Freebee, this information can be broadcast from the home WiFi AP to all the ZigBee nodes inside the home to enable "away mode", such as lowering home temperature to an energy-economic value. Likewise, as soon as the resident returns, his/her smart phone associates to the WiFi AP, where the information is again immediately delivered to ZigBee nodes to initiate "home mode".

Benefit to WiFi—Energy reduction: Operating WiFi Network Interface Card (NIC) continuously depletes energy in the portable devices quickly. To tackle this issue, a recent work suggests attaching a second ZigBee radio to the device, so that it wakes up the WiFi NIC whenever it detects the existence of any WiFi AP.

Figure 2:
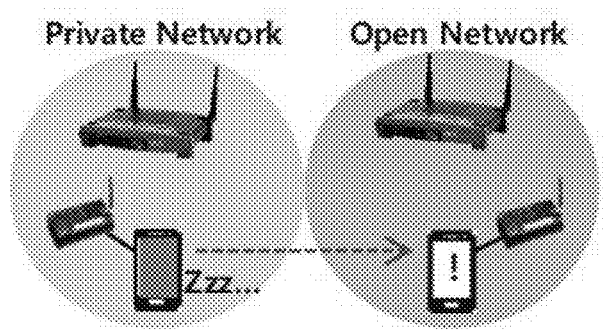
FIG. 2 is a conceptual diagram depicting a wake on Selective WLAN, in accordance with one or more techniques of the current disclosure.
Figure 3:
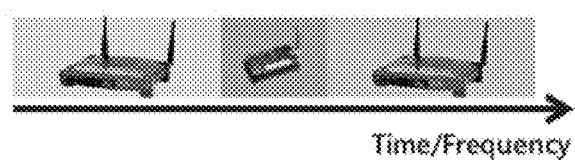
FIG. 3 is a conceptual diagram depicting an Inter-technology Channel Coordination, in accordance with one or more techniques of the current disclosure.

Many metropolitan areas are packed with numerous WiFi APs, many of which are private. Thus, it is still waste of energy to blindly wake up when an arbitrary AP shows up, without knowing if it is accessible or not. As shown in FIG. 2, the techniques described herein avoid this issue by embedding 1-bit accessibility information (i.e., open/private) into WiFi beacons and allowing attached ZigBee device to capture this information through FreeBee. Accordingly the WiFi NIC can wake up only when it finds an open AP. The techniques described herein include wake on selective WLAN. The techniques described herein can be extended to limiting WiFi wakeup only upon discovering an AP that fits the user's interest; for instance, when there is an AP that matches user-defined SSID.

Benefit to all—Channel efficiency improvement: This section explains how FreeBee design can benefit both WiFi and ZigBee networks via inter-technology channel coordination. As a result of evolving separately without considering each other, channel access schemes in WiFi and ZigBee are incompatible, which leads to severe Cross Technology Interference (CTI). For instance, back off slot is much shorter in WiFi compared to ZigBee, granting unevenly more chances of channel usage to WiFi. In fact, the solution to this unfairness problem is fundamentally limited by large asymmetry in transmission powers in two platforms; ZigBee transmissions are hardly sensed by WiFi due to their limited signal power.

Inter-technology channel access problem can be addressed allowing explicit communication among WiFi AP and ZigBee nodes. First, the techniques described herein note that all WiFi traffic, both upstream and downstream, is coordinated by AP. In other words, entire WiFi traffic can be monitored and controlled by WiFi AP. Therefore, AP is able to allocate WiFi traffic either in time or frequency (i.e., channel). Then, it broadcasts this information to ZigBee nodes, so that ZigBee communication can occur within the time or channel of vacancy. This essentially allows TDMA or FDMA among heterogeneous wireless platforms, alleviating CTI.

Framework Design.

In this section the framework design is described, followed by modulation and demodulation techniques, which serve as the core of FreeBee.

Design Overview.

The techniques described herein include a communication framework between WiFi and ZigBee where messages are embedded into the timings of beacon frames. Specifically, the techniques described herein slightly shift the transmission time (advance or delay) of beacon frames, a configurable setting in most WiFi APs. The shift is made in the units of 1.024 ms, compliant to the 802.11 standard's unit used in beacon scheduling, known as TBTT (Target Beacon Transmission Time). To ensure band-free, FreeBee shifts timing in such a way that the average interval remains the same as the original setting. Thus, the proposed communication framework not only transparent, but also does not consume additional bandwidth or energy. This unique aspect enables important information to be broadcast continuously, safely reaching mobile and/or duty cycled ZigBee receivers whose presence or active periods are unknown a priori to the transmitter.

However, WiFi beacons cannot be directly captured and recognized by ZigBee nodes, due to incompatible PHY layers. Instead, as WiFi coexist with ZigBee on the 2.4 GHz ISMband, a ZigBee receiver detects statically the position of the WiFi beacons in wireless channel, using physical its RSSI sensing capability. The techniques described herein note that, as a foundational function for MAC techniques including CSMA, RSSI sampling is common throughout varieties of wireless standards (e.g., Bluetooth).

Figure 4:
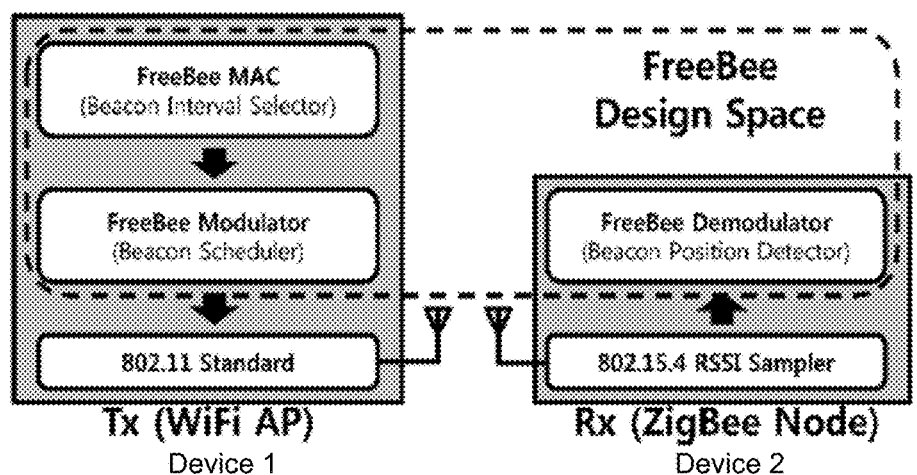
FIG. 4 is a conceptual diagram depicting a design space and scope, in accordance with one or more techniques of the current disclosure.

As depicted in FIG. 4, the scope of this paper spans modulation/demodulation techniques, as well as MAC for multiple concurrent communications. The techniques described herein note that the entire design sits on top of 802.11 and 802.15.4 standards. The techniques described herein are compatible with all 802.11 variants (i.e., a/b/g/n) and 802.15.4-compliant nodes (e.g., telosB and MICAz). In fact, the techniques described herein can be adopted to enable communication between any heterogeneous wireless platforms as long as the channel is shared. In the following the techniques described herein describe a basic version of FreeBee, with the simplest form. Then, more elaborated designs that address the challenges of the basic version are described.

Figure 5:
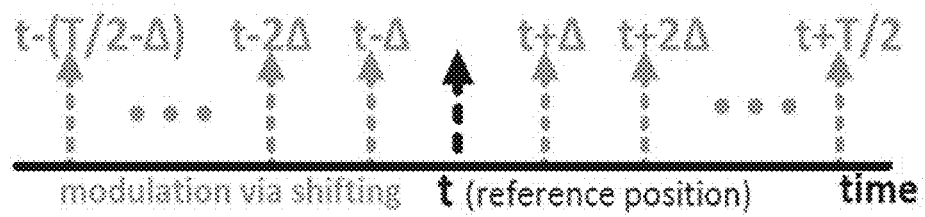
FIG. 5 is a conceptual diagram depicting a message is embedded by shifting the beacon from its reference position, t, where the degree of shift ranges between (−T/2, T/2], in accordance with one or more techniques of the current disclosure.

In order for timely advertisement, 802.11 standard requires APs to periodically broadcast beacons. FreeBee realizes band-free communication by embedding messages within the transmission timing of these mandatory packets. Referring to FIG. 5, consider a beacon whose reference position is at t, where the interval is T. Applying FreeBee, the techniques described herein shift the beacon from its reference position in the range of $(-T/2, T/2]$ to indicate the message to be delivered. The amount of information that can be embedded is determined by T and the granularity of shift, indicated by $\Delta$ in FIG. 5. The techniques described herein set $\Delta$ as 1.024 ms, following the beacon scheduling granularity defined the 802.11 standard. Under typical T of $100\Delta=102.4$ ms adopted in majority of legacy WiFi APs, beacon can be positioned at 100 different time instants. Thus, beacon shift can express $\lceil \log_2 100 \rceil = 6$ bits.

Due to incompatible PHY layers, ZigBee receiver is unable to decode the beacons and thus cannot detect the presence of beacons directly. Therefore the techniques described herein statistically locate beacons by their periodic repetition. For instance, to deliver a FreeBee message corresponding to $t-\Delta$ in FIG. 5, multiple consecutive beacons are shifted for the same amount. I.e., Beacons are transmitted at $t+T-\Delta$, $t+2T-\Delta$, and so on. The required number of beacon repetition per message is decided by the channel noise, which will be discussed in detail in later sections. Lastly, the techniques described herein note that beacon interval still remains at T in the process of FreeBee transmission, indicating band-free operation.

Demodulation.

Here the techniques described herein describe how FreeBee captures and interprets position-modulated beacons for successful demodulation, especially under channel noise. (i.e., other ongoing traffic within the same band). As an energy-based communication, reception of FreeBee signal starts from sampling the energy in the channel. This is done by consecutively recording the values obtained from the RSSI register on an 802.15.4-compliant RF chip on the ZigBee node. Upon recording a stream of RSSIs, the captured values are quantized to binaries; 0 if below threshold and 1 if above, to indicate clear and busy channels. The threshold is set to be −75 dBm following the CCA (Clear Channel Assessment) threshold for 802.15.4 standard. The techniques described herein will refer to the binary value simply as RSSI from now on and throughout the paper. Furthermore, as one RSSI sample is a measurement spanning for 128 us, the sampling rate set to be 1/128 us=7.8 KHz in order to avoid time gaps between samples while keeping the rate at its minimum.

The techniques described herein fold the obtained binary RSSI stream. Folding is a signal processing technique that allows a computing device to detect periodic signal even under noisy channel. The techniques described herein note that this technique was recently highlighted by ZiFi to detect the presence of WiFi AP. Let us think of this stream with N RSSI samples as a row vector. This vector is then folded with a period P. To do so the stream is first cut into multiple sub-vectors of the same length P to yield N/P row vectors. By stacking up the sub-vectors the techniques described herein obtain a matrix of size N/P by P. The binary RSSI values in each column of the matrix are then summed to yield P values, referred to as the fold sum.

Figure 6:
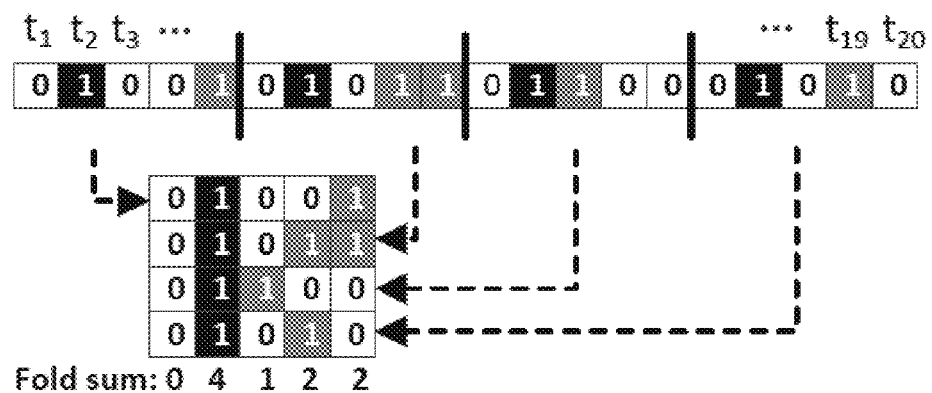
FIG. 6 is a conceptual diagram depicting a folding example: series of RSSI samples expressed as boxes. Both black and gray indicate busy channel (i.e., RSSI above threshold) where the former is a periodic beacon signal with $\lambda=5$, while the latter is random noise induced by regular traffic. White represent channel idle. By folding the series into a matrix with P=5 (=$\lambda$), black boxes align column-wise, in accordance with one or more techniques of the current disclosure.

Consider beacons with an interval of T seconds in the original vector. Let the number of samples in T be denoted as $\lambda(=T128\times10^{-6})$. The fold sum is maximized when folded with P=$\lambda$, as the periodic RSSIs with 1s due to beacons they will align at a single column. Note that the fold sums are likely be smaller in other columns, with RSSIs of is induced by either random (thus aperiodic) traffic, or even beacons whose intervals are not T. In other words, column of a high-valued fold sum strongly suggests the existence of beacons where $\lambda$=P. FIG. 6 shows an example of folding when N=20 and $\lambda$=P=5. Maximum fold sum in the second column indicates the beacon in the position. To sum up, FreeBee demodulation is process of finding the column corresponding to beacon position, which can easily be achieved by folding and simply picking the column with the maximum fold sum. Note that the FreeBee returns the reference position of the beacon when they are at their original positions. Modulated positions found later on are compared to the reference position to find the modulated information (i.e., bits) within. The techniques described herein also note that other techniques, such as FFT (Fast Fourier Transform) and autocorrelation are infeasible for this purpose as they do not yield the exact position of the beacon.

FreeBee in the previous section embeds the message as beacon time shift from the reference position; a concept which requires learning the position beforehand. The techniques described herein relax this condition to introduce A-FreeBee (Asynchronous FreeBee).

Figure 7:
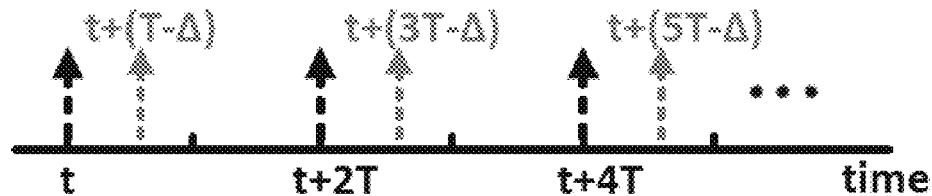
FIG. 7 is a conceptual diagram depicting a described technique: the positions of every other beacons are shifted (in gray), whereas the degree of shift is D in the example, in accordance with one or more techniques of the current disclosure.

Modulation of A-FreeBee is illustrated in FIG. 7. Applying A-FreeBee to beacons with interval of T, beacons are scheduled to construct two streams of beacons (black and gray) with the same interval of 2T, where one stream is a shifted version of the other (i.e., they differ in phase). This is achieved by shifting every other beacon by the amount that corresponds to the message to be delivered. FIG. 7 demonstrates a case where the message corresponds to $\Delta(=1.024$ ms). The techniques described herein note that A-FreeBee remains band-free, as interval between consecutive beacons repeats between T−$\Delta$ and T+$\Delta$, averaging to T.

Figure 8:
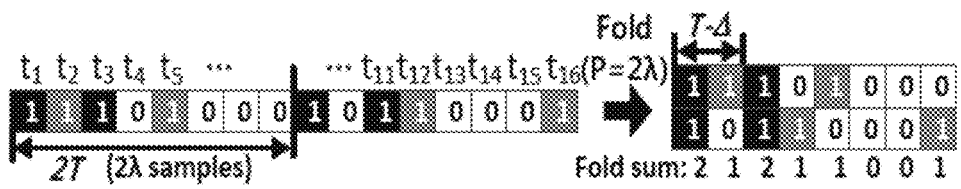
FIG. 8 is a conceptual diagram depicting a folding example for a described technique: two high-fold sum columns in a described technique can be detected via folding, in accordance with one or more techniques of the current disclosure.

Under A-FreeBee design, the reference position is no longer required; it simply looks for two beacon streams with the same period, where the embedded message is interpreted directly from the phase difference. This is achieved by folding with P=2l. Two columns with first and second highest fold sums are found, where the distance in between indicates A-FreeBee message. An example in shown in FIG. 8, where N=16 and P=2l=8. Two beacon streams are depicted in black boxes, where gray boxes are noise. Since l=4, the original (i.e., unmodulated) positions for the two black boxes in t3 and t11 are t5 and t13. The distance between the two columns with highest fold sum is T−D, from which the embedded information, D, can be easily found since T can be derived from $$P\left(=2\lambda=\frac{2T}{128\times10^{-6}}\right).$$

Asynchronous version features several advantages over the basic FreeBee including (i) requiring no synchronization, (ii) robust to clock drifts, and (iii) supporting instantaneous communication. The techniques described herein note that all these improvements come with a trade-off in transmission speed; A-FreeBee requires beacons to form two high fold sums instead of one (in basic FreeBee), leading to more number of repetitions.

In the face of multiple FreeBee-enabled APs, selecting the same or arbitrary intervals may lead the messages to tangle, and cause errors at demodulation. In this section the techniques described herein address this issue to allow simultaneous transmissions of arbitrary number of (A−) FreeBee messages such that each of them can be safely demodulated at the receiver.

Interval Multiplexing.

Recall that, according to 802.11 standard, beacon interval T is defined as multiples of D (=1.024 ms). Let beacon intervals of n neighboring APs be x1D, x2D, . . . , xnD. The techniques described herein allows simultaneous communication if any pair of xi and xj are co-prime when i 6=j. The techniques described herein refer to this as interval multiplexing, which is demonstrated in FIG. 9, which shows two FreeBee senders with intervals T1=3D (in black) and T2=5D (in gray), where each D is represented with a RSSI sample.

Figure 9:
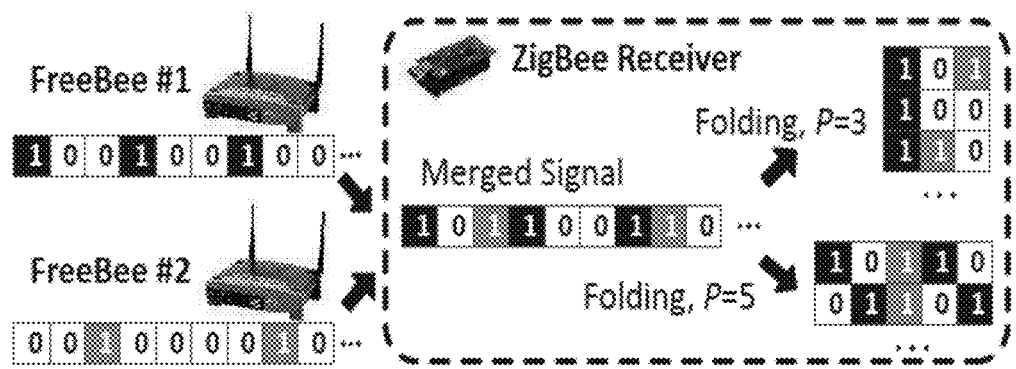
FIG. 9 is a conceptual diagram depicting demodulating period-multiplexed messages, in accordance with one or more techniques of the current disclosure.

As FIG. 9 demonstrates, the RSSI stream at the receiver includes merged signal from two senders, where they do not affect demodulation of each other. By folding with P=3 and 5, and looking for the column with highest fold sum, the receiver can detect the position of the beacons as if the other signal does not exist. This is because 3 and 5 are co-primes, and it no longer holds when they are not; for example, consider a RSSI stream including beacons with intervals T1=2D and T2=4D. When folded by P=4, both beacons will form maximum fold sum, causing demodulation error. The techniques described herein note that while the FIG. only shows two senders for clarity, this idea can be extended to n senders as long as the intervals are pairwise co-prime. The rationale behind this scheme is given in the following proposition:

For FreeBee signals with co-prime intervals, folding for one signal bounds the fold sum of the others to be less than or equal to 1. Proof Let T1=x1D and T2=x2D be two beacon intervals where x1 and x2 are co-prime. When a RSSI stream containing beacons of interval of T1 is fold by T2, beacon repeats in a column every LCM (least common multiple) of x1 and x2, which is x1×x2. Since the length of the RSSI stream is much smaller than x1×x2, a column has either 1 or 0 beacons.

The proposition states that the cross-interference between FreeBee messages is bounded either 0 or 1 when the intervals are co-prime, essentially granting orthogonality between messages for concurrent communication. The techniques described herein note that this holds for both basic FreeBee and A-FreeBee.

Interval Multiplexing in Practice.

To avoid the overhead in computing for co-prime numbers, the techniques described herein allow APs to select among a set of pre-stored prime numbers instead. Moreover, the same interval should not be chosen among neighboring APs, which can be easily achieved with a minimum coordination among APs; they listen to each other to acquire the beacon interval information (i.e., x in T=xD) recorded within beacons. After storing a set of intervals used by the neighboring APs, an unoccupied prime number is chosen as its interval. Moreover, knowing that beacon interval is related to user experience (e.g., association delay), a number that best fits the user demand should be chosen. It is important to note that interval multiplexing automatically suppresses interference from beacons transmitted by legacy WiFi APs with any interval, since prime intervals utilized in FreeBee are co-primes with any other intervals.

As described earlier, FreeBee MAC via interval multiplexing is transparent to the receiver. That is, demodulating each interval-multiplexed FreeBee signals remains the same as the case for a single FreeBee demodulation; Folding with P yields FreeBee signal with P=1 (2l for A-FreeBee). Therefore the receiver simply folds the sampled RSSI stream for different P's according to the pre-stored prime number set which beacon intervals can be chosen from.

As described above, (A–) FreeBee can express log 2100 bits per symbol under typical beacon interval of 100 D, without introducing additional traffic. Although this most of the time suffices for the aim of delivering short control messages (e.g., whether an AP is open only costs a single bit), the techniques described herein acknowledge that some applications may require to transfer larger data. The solution to this problem is straight-forward: the data can be broken down into multiple, consecutive (A) FreeBee messages, where specific bit patterns are designated to indicate start and end of data.

We note that this approach still remains band-free. Furthermore, the techniques described herein emphasize that this is a unique and powerful feature exclusive to techniques described herein: As each sender is required to select different beacon interval, consecutive messages demodulated with the same interval is ensured to be from the same sender. This allows safely constructing a long message by appending received messages. However, this is not the case for other inter-technology techniques. In Esense, HoWiES, and GSense, a sender ID has to be embedded along with information in order to concatenate separate messages correctly, leading to large overhead in such low-rate communication.

Figure 10A:
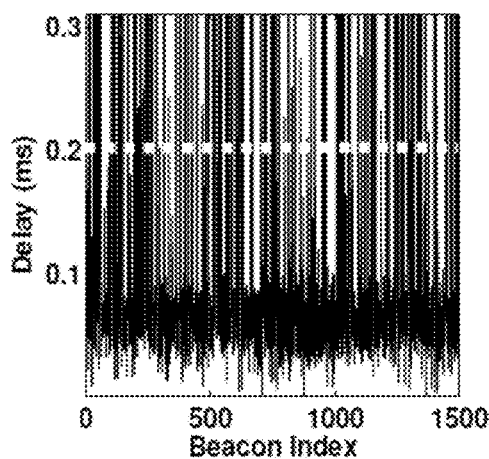
FIGS. 10A-10B are conceptual diagrams depicting a result obtained from 1,500 that suggests that above 90% of the delay is less than 200 us, which is around the knee of the curve, in accordance with one or more techniques of the current disclosure.
Figure 10B:
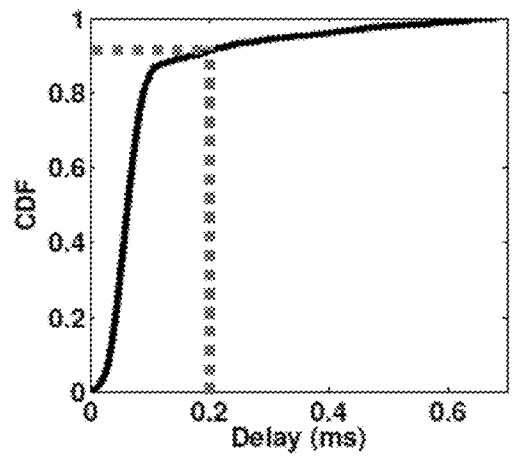

The question of which samples to be ignored can be answered by analyzing the channel access (i.e., MAC) delay in 802.11. Recordings of delays from 1,500 beacons in a university building and their distribution are shown in FIG. 10. It demonstrates that over 90% of delay is less than 200 us, where it can be understood via referring to the WiFi standard. According to the most popular 802.11g, the delay is 0 in case of channel idle at the time of beacon transmission, where it is uniformly chosen from 0 to 279 us in case of busy channel (i.e., [0-31] slots, where slot duration is 9 us). This result states that only the first two RSSI samples are needed in techniques described herein. The following samples are not only unhelpful, but detrimental as they act as noise. Thus the techniques described herein filter out RSSIs (i.e., set to 0) starting from the third.

Figure 11:
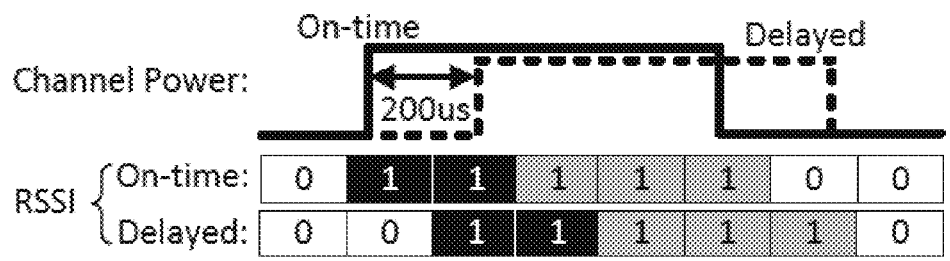
FIG. 11 is a conceptual diagram depicting boxes with is are RSSI samples above the threshold while 0s indicate below. By filtering, only blacks are kept while grays are discarded (i.e., turned to 0). Since the duration of a RSSI sample is 128 us, two samples per beacon are sufficient to induce RSSI overlap between the beacons (Second and first RSSI samples in on-time and delayed beacons, respectively), in accordance with one or more techniques of the current disclosure.

The idea behind the filtering is shown in FIG. 11. Consider two beacons where one is on time while the other is delayed by 200 us. Now the techniques described herein only leave the two earliest samples from each beacon as 1s and set the following samples as 0s. Then, the second sample of the on-time beacons overlaps with the first sample of the delayed one. In fact, Recalling that one sample of RSSI has the duration of 128 us, acquiring the first two samples induce overlap when folded, up to 256 us delay. This covers most of the beacon delays, as the delay is most likely less than 200 us according to FIG. 10.

Figure 12A:
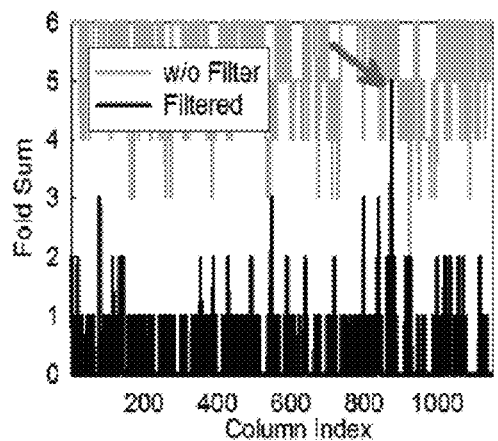
FIGS. 12A-12B are conceptual diagrams depicting a described technique including a demodulation example when T=150$\Delta$=150 ms and $\lambda$=1150, in accordance with one or more techniques of the current disclosure.
Figure 12B:
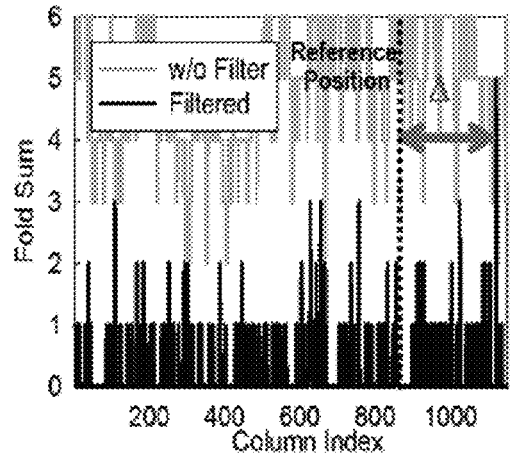
Figure 13:
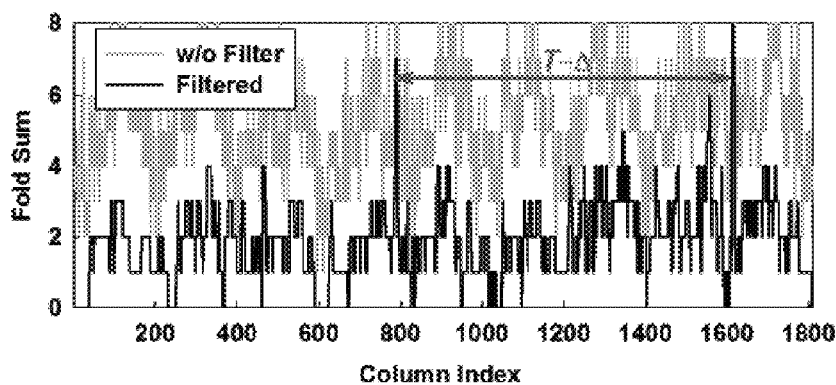
FIG. 13 is a conceptual diagram depicting a folding technique of a described technique under heavy noise, in accordance with one or more techniques of the current disclosure.

Due to the above reason only two samples per packet are taken, where this rule is applied to every packet including beacons, as ZigBee receivers are unaware of the packet type at the time of RSSI sampling. The techniques described herein note that this filtering addresses the three aforementioned problems: (i) channel access delay, (ii) lengthy beacons, and (iii) excessive noise. By taking the first two RSSI samples the techniques described herein are able to capture a large portion (90%) of the beacons, addressing the delay problem. FIGS. 12 and 13 show examples on the impact of filtering for FreeBee and A-FreeBee under severe channel noise—when channel is above the threshold for 50% of the time. Beacon position can be clearly detected in both FIGS. 12 and 13 after filtering, whereas it is unclear without it. Note that FIGS. 12 and 13 are here only for illustration purpose.

Validity of the Filter.

Figure 14A:
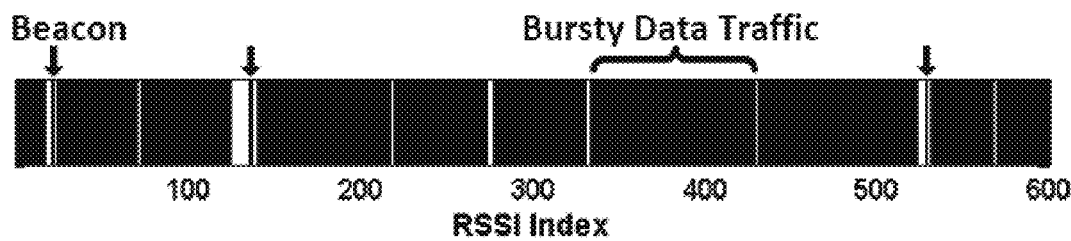
FIGS. 14A-14B are conceptual diagrams depicting an inter-packet duration, with more than 99% of the beacons having more than 256 us channel vacancy before their transmission.
Figure 14B:
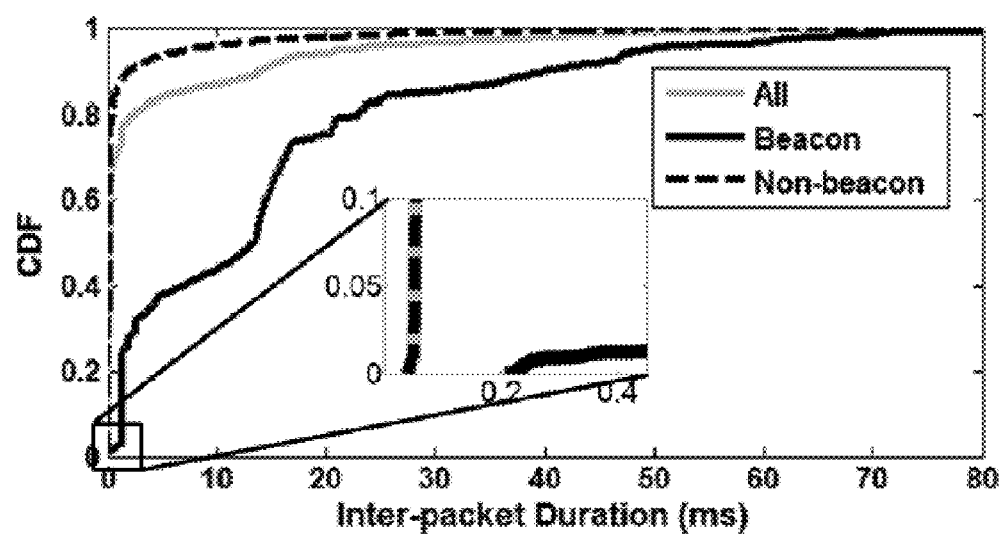

As described above, the noise filter only takes the first two RSSIs from the beginning of a packet. In other words this design is effective only if the beginning of the beacon can be appropriately captured with RSSI samples, via transition from 0 to 1. (Note that the techniques described herein only care about beacons, and not about any other packets.) The inter-packet duration in WiFi can be as small as 10 us (SIFS in 802.11b/g/n) while the duration of a RSSI sample is 128 us. This indicates the possibility that RSSI may miss small inter-packet channel vacancies and falsely interpret multiple WiFi packets as a single packet. However, the experimental result in FIG. 14(a) shows that beacons are preceded with channel vacancies (i.e., white gaps). This is because a beacon is a single packet, unlike large data traffic which often causes multiples of bursty packets. Statistical result depicted in FIG. 14(b) shows that the inter-packet durations preceding beacons is mostly (>99%) larger than 256 us. Therefore the beginning of beacons can be safely captured via RSSI transition, validating the efficiency of the noise filter.

The techniques described herein include a few parameters. First, referring back to RSSI stream prior to folding, the techniques described herein define channel occupancy ratio, B, as the ratio of 1's in the entire stream. This reflects the amount of traffic present in the channel. Equivalently, higher B indicates more noise in the demodulation process. Then, let Bf stand for the ratio after filtering; the noise filter described in Section 4 draws two RSSI samples per packet (including beacon). From the experiment an average of 12 samples per packet was observed, which leads to Bf=B 6. Moreover, let Bb denote the probability for delay of beacon being less than 256 us. That is, Bb expresses the chance a beacon contributing to fold sum.

TABLE 1

Symbol Error Rate Derivation

| | FreeBee | A-FreeBee |
|---|---|---|
| Max noise fold sum | $\Pr(N \leq n) = \left\{ \sum_{i=0}^{n} \binom{P}{i} B_f^i (1-B_f)^{P-i} \right\}^{\lambda-0}$ (1) | $\Pr(N_A \leq n) = \left\{ \sum_{i=0}^{n} \binom{P}{i} B_f^i (1-B_f)^{P-i} \right\}^{2(\lambda-1)}$ (2) |
| | $\Pr(N = n) = \Pr(N \leq n) - \Pr(N \leq n-1)$ | $\Pr(N_A = n) = \Pr(N_A \leq n) - \Pr(N_A \leq n-1)$ |

TABLE 1-continued

Symbol Error Rate Derivation

| | FreeBee | | A-FreeBee | |
|---|---|---|---|---|
| Beacon fold sum | $\Pr(S = s) = \binom{\rho}{s} B_b^i (1 - B_b)^{\rho - s}$ | (3) | | |
| Symbol Error Rate | $SER = \Pr(S - N \le 0)$ | (4) | $SER_A = 1 - \{\Pr(S - N_A > 0)\}^2$ | (5) |
| | $= \sum_{s=0}^{\rho} \sum_{n=s}^{\rho} \Pr(S = s)\Pr(N = n)$ | | $= 1 - \left\{ \sum_{n=0}^{\rho-1} \sum_{s=n+1}^{\rho} \Pr(S = s)\Pr(N_A = n) \right\}^2$ | |

Furthermore, the techniques described herein use $\rho$ to indicate the number of repetition, which is defined to be the number of rows in the matrix upon folding. As RSSIs are quantized to be either 0 or 1, the fold sum for each column can range to 0 to $\rho$. Also, it should be noted that $\rho$ is directly proportional to sampling duration, which is the duration of RSSI sampling. For basic FreeBee RSSI stream is folded for every beacon interval, T.

$$\text{Therefore } \rho = \frac{\text{Sampling Duration}}{T}.$$

As A-FreeBee requires folding at 2T, $$\rho = \frac{\text{Sampling Duration}}{2T}.$$

Conversely, the techniques described herein let $\lambda$ represent the number of RSSI samples within T, $\lambda$ and $2\lambda$ indicate the number of columns (after folding) for FreeBee and A-FreeBee. Lastly, symbol is the data unit carried on a single (A-)FreeBee message. For instance, in case of FreeBee, beacon can be shifted to 100 different positions. Therefore a symbol carries $\log_2$ 100 bits. Symbol error occurs upon demodulation failure, causing loss of all the bits within the symbol.

SER vs. Sampling Duration.

The techniques described herein offer insight on the relationship between SER (symbol error ratio) and sampling duration, starting from the basic FreeBee case. First, let us derive the distribution of fold sum incurred by noise and beacon. Since the demodulation in techniques described herein is simply picking a column with the maximum fold sum, SER corresponds to the probability where the fold sum of noise is greater than or equal to that of beacon. Let N denote a random variable indicating the maximum of the fold sums among $\lambda-1$ columns (excluding the one with beacon). Recall that the fold sum of a column is the sum of $\rho$ samples where each has probability of $B_f$ of having 1. Thus, the probability of a column to have n fold sum can be described by binomial distribution, $$\binom{\rho}{n} B_f^n (1 - B_f)^{\rho - n}.$$

From this $N \le n$ holds when all $\lambda-1$ columns have fold sums less than or equal to n, which yields Eq 1.

The techniques described herein let random variable S indicate the fold sum induced by beacons. Then S is also binomially distributed, as shown in Eq 3. Finally, as beacon cannot be detected (i.e., error occurs) whenever a fold sum of noise is larger or equal to that of beacons, SER can be expressed in terms of S and N as in Eq 4. Note that $-\rho \le S - N \le \rho$ since both N and S can only range from 0 to $\rho$.

We use notation $SER_A$ to represent the SER for A-FreeBee. Equally to the FreeBee case, symbol error occurs when the fold sum of noise at any column exceeds that of beacons. Let $N_A$ denote the maximum noise fold sum. Then, its distribution follows Eq 2. Note for A-FreeBee there is $2\lambda-2$ number of columns available for noise, since A-FreeBee is folded at $2\lambda$ and the techniques described herein have two columns allocated to beacons. The distribution of the beacon fold sum, S, is equivalent to that of FreeBee (Eq 3). Finally, $SER_A$ becomes the probability of any one of the two beacon fold sums (both following the distribution of S) to be lower than the maximum noise fold sum (i.e., $N_A$), which can be expressed as Eq 5.

The relationship between SER and sampling duration is depicted in FIG. 15. The FIGS. are computed using Eq. 4 and 5, where r is converted to the durations of T=102.4 ms and 2T=204.8 ms for FreeBee and A-FreeBee. The interval duration in the FIG. is selected as the most popular interval setting in legacy WiFi APs available today. Furthermore, $B_f$ and $B_b$ are set as $$\frac{B}{6}$$

and 0.9 referring to FIG. 10. Although the FIGS. ranged B to be [0.1, 0.9] for completeness, the experiments showed an average of B=0.3 in a university building with heavy traffic and 50+ APs. The FIGS. suggest that FreeBee and A-FreeBee gain SER of less than 0.1% for durations of 921 ms and 1,638 ms under such condition.

Transmission Rate Vs. Beacon Interval.

Alongside with $\rho$, beacon interval, T, is another factor that can potentially affect (A-) FreeBee performance. The impact of beacon interval can be observed with bit rate, R. Intuitively, larger beacon interval is beneficial as it allows express more bits per symbol. However, the downside is that it requires more time in order to reach the same $\rho$. Bit rate for FreeBee can be computed as below:

$$R = \frac{\log_2 T/\Delta}{T \times \rho} bps \quad (6)$$

where the numerator implies bit per symbol. FIG. 16 shows the impact of beacon interval on R in different scenarios.

FIG. 16 conveys two ideas: (i) The impact of T is higher for small r. (ii) Increase in T soon turns detrimental to R and the effect of T fades away when it is long enough. In A-FreeBee the rate is cut down in half as T in the denominator in turns to 2T while the numerator (i.e., bit per symbol) remains the same.

Transmission Rate Boost.

In this subsection the techniques described herein introduce a way to boost up Free-Bee's transmission rate by granting additional channel usage. As discussed before, multiple FreeBee messages can be transmitted concurrently from multiple WiFi APs using interval multiplexing. By applying interval multiplexing on a single AP instead, the techniques described herein can boost the transmission rate of an AP linearly with the increasing number of beacon streams.

To demonstrate the efficiency of FreeBee under this technique, the techniques described herein compare the achievable throughput with Esense, a state-of-the-art WiFi to ZigBee communication framework. The comparison is made under the same channel occupancy for a fair comparison. According to Esense, it utilizes data packets which are usually much longer than beacons. Packets of the same size are repeatedly sent 10 times to securely deliver a symbol of size $\log_2$ 100 bits under 802.11b ($\log_2$ 10 for 802.11g).

Throughput comparison is depicted in FIG. 17, where the techniques described herein assumed $T_i$=102.4 ms (=100Δ), ∀i for simplicity. Beacon and packet durations are set at their average values. FIG. 17 shows that FreeBee achieves higher throughput for the same degree of channel occupancy; at 6% occupancy, Esense reaches 6.6 bps while it is 74.7 for FreeBee, indicating over 1000% improvement. The main reason for this is the use of beacon in techniques described herein. Esense, on the other hand, demands much longer data packets required to be transmitted at the minimum rate of 1 Mbps, thus occupying the channel for longer time duration.

Experimentation.

In this section the techniques described herein start from validating the performance of techniques described herein via empirical performance results, obtained from testbed experiments under different scenarios. The techniques described herein then follow up with verifying the transparency between FreeBee messages as well as to existing networks. Finally, taking advantage of the band-free design, the techniques described herein examine the performance when the ZigBee receivers are mobile and duty cycled.

Experiment Setup.

The experimental setup is shown in FIG. 20. Sender side of techniques described herein is implemented on five to eight different laptops with different WLAN NICs including Qualcomm, Realtek, and Intel to avoid hardware bias. The laptops utilize Lorcon2 packet injection library to schedule and transmit beacons according to FreeBee. This is a reasonable approach since laptops/PCs running software AP are frequently used in practice. A screenshot of a phone in the FIG. demonstrates the sender-side implementation. As receivers the techniques described herein use 30 MICAz ZigBee-compliant nodes to capture RSSI values where they are recorded within the nodes' on-board flash. The values were later flushed to a PC for analysis. The techniques described herein use WiFi channel 1 (2.412 GHz). This is one of the three (i.e., 1, 6, and 11) most commonly used channels for WiFi deployment, granting generality to the result. ZigBee receivers were set to channel 12 (2.410 GHz), overlapping with the WiFi channel. The distance between the sender and receivers are 8 meters by default, unless otherwise stated.

FreeBee Performance.

The techniques described herein reveal the performance of techniques described herein in practice, under both indoor and outdoor environments in a residential area. More than 2,500 symbols are sent, where each of them are demodulated for SER computation. The results for FreeBee and A-FreeBee are depicted in FIGS. 18(a) and 18(b). In summary, both designs reach SER≈0 when ρ=9 (i.e., 0.8 s and 1.6 s for FreeBee and A-FreeBee), regardless of the environment. The result indicates that a ZigBee receiver is ensured to correctly receive a symbol by listening to the channel for the corresponding amount of time.

Looking closer, it can be further observed that the both designs perform better in outdoor environment, where SER quickly falls to 0 when ρ=5 (i.e., 0.45 s and 9 s for FreeBee and A-FreeBee). This is due to lower channel occupancy, B. In other words, the channel is less crowded and thus there is limited noise to cause errors in FreeBee. Specifically, B=3.8% outdoor, where it is 12.1% indoor. Finally, the constellation in FIG. 18(c) illustrates where demodulated symbols, represented as dots, reside when a 6 bit symbol of '100011' was repeatedly sent 2,500 times. As can be observed in the FIG., most of the dots are positioned within the boundary of transmitted symbol, indicating successful communication.

Cross-Technology/Channel Broadcast.

As a generic communication framework, FreeBee allows broadcast to heterogeneous receivers with overlapping frequencies. The techniques described herein may be effective in practice, since the techniques avoid the complexity associated with technology-specific operation. In the experiment, WiFi and ZigBee were set to channels 4 and 15 to listen to Bluetooth's advertisement channel of 38 simultaneously. In this particular case, WiFi receiver, compared to ZigBee, suffers from larger SER. It is due to higher noise, as WiFi channel 4 overlaps with the popular WiFi channels of 1 and 6, while ZigBee channel 15 does not.

The techniques described herein further include a feature where a sender with wider bandwidth (WiFi) reaches multiple narrower-band receivers (ZigBee) on different channels with a single broadcast. WiFi's bandwidth spans 20 MHz while it is only 2 MHz for ZigBee. The experiment results show that SER on channel 14 is larger than that of channel 15. This is because channel 14 is affected by the noise from the heavily-used WiFi channel 1.

It should be noted that cross-technology broadcast and cross-channel broadcast can be combined to support more sophisticated scenarios where multiple heterogeneous senders deliver control symbols (through interval multiplexing) to multiple heterogeneous wireless receivers running under different channels. Such a capability would encourage further research on cross-technology coordination and control.

Transparency.

In this part of the section the techniques described herein deploy 5 senders, F1-F5, with beacon intervals of {91.1, 99.3, 103.4, 105.5, 109.6} ms (={89Δ, 97Δ, 101Δ, 103Δ, 107Δ}). The techniques described herein then allow each to operate in FreeBee ON or OFF modes. A sender embeds FreeBee message only when it is ON. When OFF, the sender acts as a typical AP to simply transmit beacons periodically without messages. Under this setting, the techniques described herein observe the throughput under single to multiple FreeBees, as well as the cross-interference among them. To do so the techniques described herein first only turn $F_1$ to ON mode, while leaving all the others OFF. Then, the techniques described herein turn $F_2$-$F_5$ to ON one by one every 10 minutes.

Transparency between FreeBees: As the black bar in FIG. 19(a) demonstrates, the throughput of $F_1$ is kept stable at an average of 13.7 bps in the face of multiple concurrent FreeBee transmissions. This validates the performance of interval multiplexing in suppressing cross-interference among FreeBee messages. In fact simultaneous transmission helps to linearly increase the aggregated throughput up to 59.7 bps, as shown by the gray bar. The techniques described herein also note that, although the throughput can be enhanced by selecting shorter intervals for $F_1$-$F_5$, the techniques described herein select ones close to that of a typical AP (102.4 ms=100Δ) to limit the channel usage to a similar level.

Transparency to legacy networks: The techniques described herein again turn $F_1$-$F_5$ to ON mode one at a time, every 10 minutes, during throughput between a pair of WiFi or ZigBee nodes are measured. The results are demonstrated in FIGS. 19(b) and 19(c). For WiFi the techniques described herein use Iperf to measure TCP throughput when operating in 802.11g. WiFi sender was placed beside FreeBees, 8 m away from the WiFi receiver. For ZigBee measurement, sender and receiver were placed 5 m apart, where 20 byte packets were continuously transmitted at the fastest speed (i.e., with the minimum inter-packet delay). The FIGS. show stable throughputs averaging in 4.1 Mbps and 19.6 Kbps for WiFi and ZigBee, with small standard deviations. This suggests that both networks are unaffected by the presence of Free-Bees, confirming that the band-free design successfully keeps FreeBee transparent to legacy networks.

Aggregated Throughput.

Through interval multiplexing our design supports: (i) boosted aggregated throughput via concurrent transmission from multiple senders and (ii) adoption of additional beacons in a single sender to increase the throughput of that sender. We note that (i) and (ii) can be applied simultaneously; that is, multiple senders transmit concurrently while each sender freely adopts additional beacons in case of a need for higher throughput. When multiple Esense senders are present and the interference from the heterogeneous wireless systems are negligible, Esense achieves the bit rate of 1.63 Kbps when a single WiFi packet is used to deliver one symbol, where five consecutive packets are needed per symbol for reliable communication. This yields a throughput of 326 bps. FreeBee from WiFi to ZigBee shows the highest throughput of 1.4 Kbps. The rate drops in other scenarios due to the same reasons discussed in the previous section; that is, a large shift unit in ZigBee and random access delay in Bluetooth. It is notable that Bluetooth to WiFi shows higher throughput of 514 bps, compared to 349 bps in the Bluetooth to ZigBee case. This is because higher sampling rate achievable in WiFi compared to ZigBee (10 MHz versus 7.8 KHz in our setting) allows precise measurement of the beacon timings and reduces the chance of noise forming a high fold sum.

These results may be achievable under a large number (hundreds) of concurrent senders, which can be realized by the following two techniques: (i) To allow numerous interval-multiplexed symbols, we choose beacon intervals from a set of numbers whose pair-wise LCM is longer than the length of the sampled RSSI vector. This clearly offers many more adoptable intervals compared to just using primes, while maintaining the effect of the interval multiplexing. (ii) As shown in the previous section, interval-multiplexed FreeBee symbols are transparent to each other under usual volume of concurrent senders (e.g., tens of Free-Bee WiFi APs). Consider the extreme case of hundreds of senders where we take cross-interference into account. This issue of cross-interference may be addressed by eliminating the beacons from the RSSI vector after they are interpreted, specifically, through demodulating symbols in the ascending order according to their intervals. After demodulating each symbol, the beacons (i.e., RSSIs) corresponding to that symbol are eliminated (i.e., flipped from 1 to 0 in the RSSI vector). By doing so the cross-interference between symbols are effectively canceled to yield a high throughput. For instance, in WiFi to ZigBee FreeBee, SER is suppressed to be less than 5% when over 400 symbols with intervals between 91.1 ms and 2 s are concurrently sent.

Mobility and Duty Cycling.

Here the techniques described herein consider a practical scenario of mobile ZigBee receivers. For instance, this insight offers ideas on the feasibility of A-FreeBee for applications that requires location tracking. Furthermore, the techniques described herein take duty cycle into account where radios are turned off for majority of the time in the aim to preserve energy; a technique often adopted in battery-powered ZigBee networks to support long-term operations. The techniques described herein deploy several FreeBee senders in a university building and on a street, where the mobile receivers pass by the senders at different speeds: walking, running, on a bicycle and car. It is worth noting that this experiment takes advantage of FreeBee's band-free design; FreeBee messages can be continuously broadcast without occupying the channel, thus reaching mobile and/or duty-cycled receivers who presence or active periods are unknown a priori.

In a university building: A total of 8 FreeBee senders are deployed as shown in FIG. 21(a). Among them, 5 senders, $F_1$-$F_5$, are positioned in corners of the hallway (corner-deployed), while the others sit inside different rooms surrounded by the hallway (center-deployed). A person walks at a moderate speed of 4.3 mph, through the hallway following in the FIG. ZigBee receiver was tied to his/her backpack. Results after repeating for 30 different receivers are shown in FIG. 23. Overall, duty cycling of more than 10% and 4% ensures reception of FreeBee messages from corner and center deployed senders. This is because WiFi signals can penetrate through thin walls. Therefore receiver has more chance of being exposed to senders deployed in the center of the path, even if they sit inside rooms.

On a street: In this experiment the techniques described herein deploy 3 FreeBee senders, 20 m apart, on a street as in FIG. 21(b). The FIG. also shows receivers with different degrees of mobility: walking (4.3 mph), running (6.8 mph), on a bi-cycle (10.8 mph) and car (30 mph). Thirty receivers were tested for each. FIG. 22 informs that FreeBee messages from all the senders can be safely received with duty cycling of only 1.5%, 3%, 5% and 10% when walking, running, riding bicycle and car.

Wake on Selective WLAN.

As WiFi penetrates more and more into mobile devices, its significant energy drainage in idle state is causing issues in the battery-powered platforms. This is because WiFi NIC continuously scans the channel for available APs. To tackle this issue recent studies proposed to utilize a low-power secondary radio to wake up the WiFi interface only when APs are present. This is because the interface consumes 669.9 mW when it is awake, but it drops to only 10 mW once it starts to sleep. Meanwhile, ZigBee only requires 75 mW even when active. Among the works in the category, ZiFi is a state-of-the-art that offers a simple, infrastructure-free approach to detect APs in proximity with a ZigBee node.

Despite these effects, the techniques described herein argue that there is still a room for improvement; Knowing that most of the APs nowadays are private, blindly waking up the WiFi without knowing if it is accessible or not leads to energy waste. This problem can be easily solved with FreeBee, by allowing APs to broadcast binary information indicating if it is an open or a private WiFi. FIG. 24(a) conveys an idea on the benefit of this approach, considering a 500×500 m2 area around a shopping mall. For a realistic evaluation, the techniques described herein observe all private and open WiFi APs currently running in the area via wigle.net and openwifispots.com. Private WiFi APs are marked as light-gray circles, and open APs are illustrated as outlined circles. The radiuses of the circles are set as 43.7 m, following the value obtained in experiments. A total of 27 WiFi APs take up 43.2% of the entire area. On the other hand only 4 open WiFi APs are found, covering only 9.6%.

The energy consumed per hour by WiFi as-is, when ZiFi is adopted, is computed and finally, when Free-Bee is introduced. For ZiFi and FreeBee, energy consumption of ZigBee node is also considered. The result in FIG. 24(b) indicates that the energy consumption for WiFi, ZiFi, and FreeBee are: 2.41 JK/h, 1.21 KJ/h, and 0.51 JK/h. In sum, FreeBee saves 78.9% and 58.2% of energy compared to WiFi and ZiFi, without sacrificing the opportunities for open WiFi access.

Despite the extensive volume of works in PPM (Pulse Position Modulation), which was widely studied in the field of optical and UWB (Ultra Wide Band) communications, these technologies are not applicable to this scenario because they are designed for pulses (which correspond to beacons in this example) that occur at their exact timings and/or they can be differentiated from noise via matched filter. Neither of the conditions are met by the beacons, since they are prone to channel access delays due to CSMA and they are not distinguishable from other traffic from ZigBee's perspective.

Network improvement through cross-platform interaction was investigated in many recent works, where cross-platform direct communication as in FreeBee was proposed in Esense, HoWiES, and GSense: Esense embeds message via WiFi packets with lengths that are unlikely to be used in normal WiFi. HoWiES makes improvement on Esense mechanism to bring energy savings in WiFi. Finally, GSense utilizes specific energy patterns within preamble or as separate packets. FreeBee is uniquely positioned from the above works mainly in two aspects: (i) the use of the mandatory beacon allows a completely band-free communication. (ii) FreeBee MAC allows concurrent communication between multiple senders and receivers.

In one example of this disclosure, a method is described comprising receiving, by a first computing device, one or more signals that are output by a second computing device, wherein the first computing device is configured to process the one or more signals according to a first wireless protocol, and wherein the second computing device is configured to output the one or more signals according to a second wireless protocol, determining, by the first computing device, a reference beacon interval associated with a plurality of beacons identified in the one or more signals, wherein the reference beacon interval is based at least in part on an amount of time between a first beacon of the plurality of beacons and a second beacon of the plurality of beacons, determining, by the first computing device, an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval, and determining, by the first computing device, a message that is based at least in part on the adjusted beacon interval.

In another example of this disclosure, a method is described comprising determining, by a first computing device, a message to be sent to a second computing device, and outputting, by the first computing device, one or more signals, the first computing device being configured to output the one or more signals according to a first wireless protocol, and the second computing device being configured to process the one or more signals according to a second wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval.

In another example of this disclosure, a system is described comprising a first computing device configured to: determine a message to be broadcast, and output one or more signals according to a first wireless protocol, the first computing device being configured to output the one or more signals according to a first wireless protocol, and the second computing device being configured to process the one or more signals according to a second wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval. The system further comprises a second computing device configured to receive the one or more signals according to a second wireless protocol, determine the reference beacon interval, determine the adjusted beacon interval, and determine the message based at least in part on the adjusted beacon interval.

FIG. 25 is a block diagram of a transmitter device and a receiver device that may be configured to perform one or more techniques in accordance with the current disclosure. In the example of FIG. 25, transmitter device 2 may be a router, a wireless access point, a mobile device, or any computing device that can be configured to output beacons according to a first wireless protocol. Transmitter device 2 may include any number of different portable electronic computing devices, such as a wearable computing device (e.g., a computerized watch, computerized headphones, a computerized headset, computerized glasses, etc.), a smart phone, a personal digital assistant (PDA), a laptop computer, a portable gaming device, a portable media player, an e-book reader, etc. Transmitter device 2 may include various input and output components, including, e.g. one or more processors, memory, telemetry modules, cellular network antennas, a display, one or more UI elements, sensors, and a power source like a rechargeable battery. Modules 4 and 6 may perform operations described herein using software, hardware, firmware, or a mixture of hardware, software, and firmware residing in and executing on transmitter device 2.

In the example of FIG. 25, wireless interface 8 may be operable to communicate with external devices via one or more wired and/or wireless networks by transmitting and/or receiving network signals on the one or more networks. Examples of wireless interface 8 may include a network interface card (e.g. such as an Ethernet card), an optical transceiver, a radio frequency transceiver, a GPS receiver, or any other type of device that can send and/or receive information. Other examples of wireless interface 8 may include Near-Field Communications (NFC) units, Bluetooth radios, short wave radios, cellular data radios, wireless network radios, as well as universal serial bus (USB) controllers.

In some examples, modulator module 6 of transmitter device 2 may be configured to determine a message to be sent to a receiver device 12. Wireless interface 8 of transmitter device 2 may be configured to output one or more signals. Wireless interface 8 of transmitter device 2 may be configured to output the one or more signals according to a first wireless protocol, and the receiver device 12 may be configured to process the one or more signals according to a second wireless protocol. The one or more signals may comprise a plurality of beacons that are associated with a reference beacon interval, the reference beacon interval being based at least in part on an amount of time between a first beacon of the plurality of beacons and a second beacon of the plurality of beacons. Modulator module 6 of transmitter device 2 may be configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval.

The message may be based at least in part on the adjusted beacon interval. In some examples, the message may include information regarding an owner of transmitter device 2, a model of transmitter device 2, one or more modules to be activated in receiver device 12, a desired configuration for receiver device 12, or a security level of transmitter device 2.

In some examples, receiver device 12 may not be configured to process the one or more signals according to the first wireless protocol. The first wireless protocol and the second wireless protocol may be different wireless protocols. For example, the first wireless protocol may be one of a WiFi® wireless protocol, a Zigbee® wireless protocol, or a Bluetooth® wireless protocol, and the second wireless protocol may be a different one of the WiFi® wireless protocol, the Zigbee® wireless protocol, or the Bluetooth® wireless protocol, or any other low powered radio protocol.

In some examples, the message may be based at least in part on a difference between the adjusted beacon interval and the reference beacon interval. In such examples, the first beacon and the second beacon are temporally consecutive beacons in the plurality of beacons. Further, in some examples, transmitter device 2 may synchronize with receiver device 12 based at least in part on the reference beacon interval.

In other examples, the message may be based only on a magnitude of the adjusted beacon interval. In such examples, the first beacon is temporally consecutive with an intermediary beacon in the plurality of beacons. The second beacon is also temporally consecutive with the intermediary beacon in the plurality of beacons. In some examples, the intermediary beacon is the third beacon.

In some examples, the message may be a first message, the one or more signals may be a first group of one or more signals, the plurality of beacons may be a first plurality of beacons, the reference beacon interval may be a first reference beacon interval, and the adjusted beacon interval may be a first adjusted beacon interval. In such examples, multiple access module 4 of transmitter device 2 may determine a second message to be sent to a second receiver device (not pictured). Wireless interface 8 of transmitter device 2 may output a second group of one or more signals according to the first wireless protocol. The second receiver device may be configured to process the second group of one or more signals according to a third wireless protocol. The second group of one or more signals may comprise a second plurality of beacons that are associated with a second reference beacon interval, the second reference beacon interval being based at least in part on an amount of time between a first beacon of the second plurality of beacons and a second beacon of the second plurality of beacons. The second reference beacon interval may be different than the first reference beacon interval. Transmitter device 2 may be configured to modulate the second group of one or more signals according to a second adjusted beacon interval that is based at least in part on an amount of time between the second beacon of the second plurality of beacons and a third beacon of the second plurality of beacons, the second beacon and the third beacon of the second plurality of beacons being temporally consecutive beacons in the second plurality of beacons, and the second adjusted beacon interval being different than the second reference beacon interval. The second message may be based at least in part on the second adjusted beacon interval.

In some examples, in outputting the one or more signals, wireless interface 8 of transmitter device 2 may broadcast, according to the first wireless protocol, the one or more signals over a first channel of the first wireless protocol. The first channel of the wireless protocol may be associated with a first frequency range. Further, a plurality of channels of the second wireless protocol may be associated with a second frequency range, such that the first frequency range at least partially overlaps with the second frequency range.

In other examples, in outputting the one or more signals, wireless interface 8 of transmitter device 2 may broadcast, according to the first wireless protocol, the one or more signals over a first channel of the first wireless protocol. The first channel of the wireless protocol may be associated with a first frequency range. Further, a second channel of the second wireless protocol may be associated with a second frequency range, and a third channel of a third wireless protocol may be associated with a third frequency range. The third wireless protocol may be different than each of the first wireless protocol and the second wireless protocol. In such examples, the first frequency range may at least partially overlap with each of the second frequency range and the third frequency range.

Further, in the example of FIG. 25, receiver device 12 may be a router, a wireless access point, a mobile device, or any computing device that can be configured to process beacons according to a second wireless protocol. Receiver device 12 may include any number of different portable electronic computing devices, such as a wearable computing device (e.g., a computerized watch, computerized headphones, a computerized headset, computerized glasses, etc.), a smart phone, a personal digital assistant (PDA), a laptop computer, a portable gaming device, a portable media player, an e-book reader, etc. Transmitter device 2 may include various input and output components, including, e.g. one or more processors, memory, telemetry modules, cellular network antennas, a display, one or more UI elements, sensors, and a power source like a rechargeable battery. Modules 14 and 16 may perform operations described herein using software, hardware, firmware, or a mixture of hardware, software, and firmware residing in and executing on receiver device 12.

Further, in the example of FIG. 25, wireless interface 18 may be operable to communicate with external devices via one or more wired and/or wireless networks by transmitting and/or receiving network signals on the one or more networks. Examples of wireless interface 18 may include a network interface card (e.g. such as an Ethernet card), an optical transceiver, a radio frequency transceiver, a GPS receiver, or any other type of device that can send and/or receive information. Other examples of wireless interface 18 may include Near-Field Communications (NFC) units, Bluetooth radios, short wave radios, cellular data radios, wireless network radios, as well as universal serial bus (USB) controllers.

In some examples, wireless interface 18 of receiver device 12 may be configured to receive one or more signals that are output by transmitter device 2. Receiver device 12 may be configured to process the one or more signals according to a second wireless protocol, and wherein transmitter device 2 is configured to output the one or more signals according to a first wireless protocol. Demodulator module 16 of receiver device 12 may be configured to determine a reference beacon interval associated with a plurality of beacons identified in the one or more signals, wherein the reference beacon interval is based at least in part on an amount of time between a first beacon of the plurality of beacons and a second beacon of the plurality of beacons. Demodulator module 16 of receiver device 12 may be further configured to determine an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval. Demodulator module 16 of receiver device 12 may further determine a message that is based at least in part on the adjusted beacon interval.

In some examples, demodulator module 16 of receiver device 12 may determine the reference beacon interval by determining a received signal strength model for the one or more signals, wherein the received signal strength model is a function of a received signal strength of the one or more signals over a period of time. Demodulator module 16 of receiver device 12 may be further configured to determine one or more peaks in the received signal strength model. Demodulator module 16 of receiver device 12 may be further configured to determine the reference beacon interval based at least in part on a pattern of the one or more peaks, wherein a first of the one or more peaks is associated with the first beacon, and wherein a second of the one or more peaks is associated with the second beacon.

In some examples, demodulator module 16 of receiver device 12 may be further configured to determine a position of the first beacon. In such examples, demodulator module 16 of receiver device 12 may be configured to determine a received signal strength model for the one or more signals, wherein the received signal strength model is a function of a received signal strength of the one or more signals over a first period of time. Demodulator module 16 of receiver device 12 may further be configured to divide the received signal strength model into a plurality of segments, wherein each segment of the plurality of segments comprises a portion of the received signal strength model over a second period of time, wherein the second period of time is equal to the reference beacon interval. Demodulator module 16 of receiver device 12 may further be configured to determine a plurality of positions within each segment of the plurality of segments, wherein each segment has a number of positions equal to a magnitude of the reference beacon interval. Demodulator module 16 of receiver device 12 may further be configured to assign a value of 1 to each position of the plurality of positions within each segment of the plurality of segments with a respective received signal strength above a received signal strength threshold. Demodulator module 16 of receiver device 12 may further be configured to assign a value of 0 to each position of the plurality of positions within each segment of the plurality of segments with a respective received signal strength below the received signal strength threshold. Demodulator module 16 of receiver device 12 may further be configured to determine a plurality of sums, wherein each sum of the plurality of sums comprises a respective value from one position from each segment of the plurality of segments. Demodulator module 16 of receiver device 12 may further be configured to determine the position of the first beacon based at least in part on a maximum sum of the plurality of sums.

In some examples, the message may include information regarding an owner of transmitter device 2, a model of transmitter device 2, one or more modules to be activated in receiver device 12, a desired configuration for receiver device 12, or a security level of transmitter device 2.

In some examples, receiver device 12 may not be configured to process the one or more signals according to the first wireless protocol. The first wireless protocol and the second wireless protocol may be different wireless protocols. For example, the first wireless protocol may be one of a WiFi® wireless protocol, a Zigbee® wireless protocol, or a Bluetooth® wireless protocol, and the second wireless protocol may be a different one of the WiFi® wireless protocol, the Zigbee® wireless protocol, or the Bluetooth® wireless protocol, or any other low powered radio protocol.

In some examples, the message may be based at least in part on a difference between the adjusted beacon interval and the reference beacon interval. In such examples, the first beacon and the second beacon are temporally consecutive beacons in the plurality of beacons. Further, in some examples, transmitter device 2 may synchronize with receiver device 12 based at least in part on the reference beacon interval.

In other examples, the message may be based only on a magnitude of the adjusted beacon interval. In such examples, the first beacon is temporally consecutive with an intermediary beacon in the plurality of beacons. The second beacon is also temporally consecutive with the intermediary beacon in the plurality of beacons. In some examples, the intermediary beacon is the third beacon.

In some further examples, the message may be a first message, the one or more signals may be a first group of one or more signals, the plurality of beacons may be a first plurality of beacons, the reference beacon interval may be a first reference beacon interval, and the adjusted beacon interval may be a first adjusted beacon interval. In such examples, wireless interface 18 of receiver device 12 may be configured to receive a second group of one or more signals that are output by a second transmitter device (not pictured), wherein the second transmitter device is configured to output the second group of one or more signals according to a second wireless protocol. Demodulator module 16 of receiver device 12 may be configured to determine a second reference beacon interval associated with a second plurality of beacons identified in the second group one or more signals output by the second transmitter device, wherein the second reference beacon interval is based at least in part on an amount of time between a first beacon of the second plurality of beacons and a second beacon of the second plurality of beacons, and wherein the second reference beacon interval is different than the first reference beacon interval. Multiple access module 14 of receiver device 12 may be configured to determine whether to receive a second message from transmitter device 2 or to receive the second message from the second transmitter device. In response to multiple access module 14 determining to receive the second message from transmitter device 2, demodulator module 16 of receiver device 12 may be configured to determine a second adjusted beacon interval, wherein the second adjusted beacon interval is based at least in part on an amount of time between a fourth beacon of the plurality of beacons output by transmitter device 2 and a fifth beacon of the plurality of beacons output by transmitter device 2, wherein the fourth beacon and the fifth beacon of the plurality of beacons are temporally consecutive beacons in the plurality of beacons, and wherein the second adjusted beacon interval is different than the reference beacon interval. Further, demodulator module 16 of receiver device 12 may be configured to determine the second message based at least in part on the second adjusted beacon interval. Alternatively, in response to determining to receive the message from the second transmitter device, demodulator module 16 of receiver device 12 may be configured to determine a third adjusted beacon interval, wherein the third adjusted beacon interval is based at least in part on an amount of time between the second beacon of the second plurality and a third beacon of the second plurality of beacons, wherein the second beacon and the third beacon of the second plurality of beacons are temporally consecutive beacons in the second plurality of beacons, and wherein the third adjusted beacon interval is different than the second reference beacon interval. Further, demodulator module 16 of receiver device 12 may be configured to determine the second message based at least in part on the third adjusted beacon interval.

FIG. 26 is a flow diagram of one or more techniques of the current disclosure. In some examples, wireless interface 18 of receiver device 12 may be configured to receive one or more signals that are output by transmitter device 2. Receiver device 12 may be configured to process the one or more signals according to a second wireless protocol, and wherein transmitter device 2 is configured to output the one or more signals according to a first wireless protocol. Demodulator module 16 of receiver device 12 may be configured to determine a reference beacon interval associated with a plurality of beacons identified in the one or more signals, wherein the reference beacon interval is based at least in part on an amount of time between a first beacon of the plurality of beacons and a second beacon of the plurality of beacons. Demodulator module 16 of receiver device 12 may be further configured to determine an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval. Demodulator module 16 of receiver device 12 may further determine a message that is based at least in part on the adjusted beacon interval.

In some examples, demodulator module 16 of receiver device 12 may determine the reference beacon interval by determining a received signal strength model for the one or more signals, wherein the received signal strength model is a function of a received signal strength of the one or more signals over a period of time. Demodulator module 16 of receiver device 12 may be further configured to determine one or more peaks in the received signal strength model. Demodulator module 16 of receiver device 12 may be further configured to determine the reference beacon interval based at least in part on a pattern of the one or more peaks, wherein a first of the one or more peaks is associated with the first beacon, and wherein a second of the one or more peaks is associated with the second beacon.

In some examples, demodulator module 16 of receiver device 12 may be further configured to determine a position of the first beacon. In such examples, demodulator module 16 of receiver device 12 may be configured to determine a received signal strength model for the one or more signals, wherein the received signal strength model is a function of a received signal strength of the one or more signals over a first period of time. Demodulator module 16 of receiver device 12 may further be configured to divide the received signal strength model into a plurality of segments, wherein each segment of the plurality of segments comprises a portion of the received signal strength model over a second period of time, wherein the second period of time is equal to the reference beacon interval. Demodulator module 16 of receiver device 12 may further be configured to determine a plurality of positions within each segment of the plurality of segments, wherein each segment has a number of positions equal to a magnitude of the reference beacon interval. Demodulator module 16 of receiver device 12 may further be configured to assign a value of 1 to each position of the plurality of positions within each segment of the plurality of segments with a respective received signal strength above a received signal strength threshold. Demodulator module 16 of receiver device 12 may further be configured to assign a value of 0 to each position of the plurality of positions within each segment of the plurality of segments with a respective received signal strength below the received signal strength threshold. Demodulator module 16 of receiver device 12 may further be configured to determine a plurality of sums, wherein each sum of the plurality of sums comprises a respective value from one position from each segment of the plurality of segments. Demodulator module 16 of receiver device 12 may further be configured to determine the position of the first beacon based at least in part on a maximum sum of the plurality of sums.

In some examples, the message may include information regarding an owner of transmitter device 2, a model of transmitter device 2, one or more modules to be activated in receiver device 12, a desired configuration for receiver device 12, or a security level of transmitter device 2.

In some examples, receiver device 12 may not be configured to process the one or more signals according to the first wireless protocol. The first wireless protocol and the second wireless protocol may be different wireless protocols. For example, the first wireless protocol may be one of a WiFi® wireless protocol, a Zigbee® wireless protocol, or a Bluetooth® wireless protocol, and the second wireless protocol may be a different one of the WiFi® wireless protocol, the Zigbee® wireless protocol, or the Bluetooth® wireless protocol, or any other low powered radio protocol.

In some examples, the message may be based at least in part on a difference between the adjusted beacon interval and the reference beacon interval. In such examples, the first beacon and the second beacon are temporally consecutive beacons in the plurality of beacons. Further, in some examples, transmitter device 2 may synchronize with receiver device 12 based at least in part on the reference beacon interval.

In other examples, the message may be based only on a magnitude of the adjusted beacon interval. In such examples, the first beacon is temporally consecutive with an intermediary beacon in the plurality of beacons. The second beacon is also temporally consecutive with the intermediary beacon in the plurality of beacons. In some examples, the intermediary beacon is the third beacon.

In some further examples, the message may be a first message, the one or more signals may be a first group of one or more signals, the plurality of beacons may be a first plurality of beacons, the reference beacon interval may be a first reference beacon interval, and the adjusted beacon interval may be a first adjusted beacon interval. In such examples, wireless interface 18 of receiver device 12 may be configured to receive a second group of one or more signals that are output by a second transmitter device (not pictured), wherein the second transmitter device is configured to output the second group of one or more signals according to a second wireless protocol. Demodulator module 16 of receiver device 12 may be configured to determine a second reference beacon interval associated with a second plurality of beacons identified in the second group one or more signals output by the second transmitter device, wherein the second reference beacon interval is based at least in part on an amount of time between a first beacon of the second plurality of beacons and a second beacon of the second plurality of beacons, and wherein the second reference beacon interval is different than the first reference beacon interval. Multiple access module 14 of receiver device 12 may be configured to determine whether to receive a second message from transmitter device 2 or to receive the second message from the second transmitter device. In response to multiple access module 14 determining to receive the second message from transmitter device 2, demodulator module 16 of receiver device 12 may be configured to determine a second adjusted beacon interval, wherein the second adjusted beacon interval is based at least in part on an amount of time between a fourth beacon of the plurality of beacons output by transmitter device 2 and a fifth beacon of the plurality of beacons output by transmitter device 2, wherein the fourth beacon and the fifth beacon of the plurality of beacons are temporally consecutive beacons in the plurality of beacons, and wherein the second adjusted beacon interval is different than the reference beacon interval. Further, demodulator module 16 of receiver device 12 may be configured to determine the second message based at least in part on the second adjusted beacon interval. Alternatively, in response to determining to receive the message from the second transmitter device, demodulator module 16 of receiver device 12 may be configured to determine a third adjusted beacon interval, wherein the third adjusted beacon interval is based at least in part on an amount of time between the second beacon of the second plurality and a third beacon of the second plurality of beacons, wherein the second beacon and the third beacon of the second plurality of beacons are temporally consecutive beacons in the second plurality of beacons, and wherein the third adjusted beacon interval is different than the second reference beacon interval. Further, demodulator module 16 of receiver device 12 may be configured to determine the second message based at least in part on the third adjusted beacon interval.

FIG. 27 is a flow diagram of one or more techniques of the current disclosure. In some examples, modulator module 6 of transmitter device 2 may be configured to determine a message to be sent to a receiver device 12 (30). Wireless interface 8 of transmitter device 2 may be configured to output one or more signals (32). Wireless interface 8 of transmitter device 2 may be configured to output the one or more signals according to a first wireless protocol, and the receiver device 12 may be configured to process the one or more signals according to a second wireless protocol. The one or more signals may comprise a plurality of beacons that are associated with a reference beacon interval, the reference beacon interval being based at least in part on an amount of time between a first beacon of the plurality of beacons and a second beacon of the plurality of beacons. Modulator module 6 of transmitter device 2 may be configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval.

The message may be based at least in part on the adjusted beacon interval. In some examples, the message may include information regarding an owner of transmitter device 2, a model of transmitter device 2, one or more modules to be activated in receiver device 12, a desired configuration for receiver device 12, or a security level of transmitter device 2.

In some examples, receiver device 12 may not be configured to process the one or more signals according to the first wireless protocol. The first wireless protocol and the second wireless protocol may be different wireless protocols. For example, the first wireless protocol may be one of a WiFi® wireless protocol, a Zigbee® wireless protocol, or a Bluetooth® wireless protocol, and the second wireless protocol may be a different one of the WiFi® wireless protocol, the Zigbee® wireless protocol, or the Bluetooth® wireless protocol, or any other low powered radio protocol.

In some examples, the message may be based at least in part on a difference between the adjusted beacon interval and the reference beacon interval. In such examples, the first beacon and the second beacon are temporally consecutive beacons in the plurality of beacons. Further, in some examples, transmitter device 2 may synchronize with receiver device 12 based at least in part on the reference beacon interval.

In other examples, the message may be based only on a magnitude of the adjusted beacon interval. In such examples, the first beacon is temporally consecutive with an intermediary beacon in the plurality of beacons. The second beacon is also temporally consecutive with the intermediary beacon in the plurality of beacons. In some examples, the intermediary beacon is the third beacon.

In some examples, the message may be a first message, the one or more signals may be a first group of one or more signals, the plurality of beacons may be a first plurality of beacons, the reference beacon interval may be a first reference beacon interval, and the adjusted beacon interval may be a first adjusted beacon interval. In such examples, multiple access module 4 of transmitter device 2 may determine a second message to be sent to a second receiver device (not pictured). Wireless interface 8 of transmitter device 2 may output a second group of one or more signals according to the first wireless protocol. The second receiver device may be configured to process the second group of one or more signals according to a third wireless protocol. The second group of one or more signals may comprise a second plurality of beacons that are associated with a second reference beacon interval, the second reference beacon interval being based at least in part on an amount of time between a first beacon of the second plurality of beacons and a second beacon of the second plurality of beacons. The second reference beacon interval may be different than the first reference beacon interval. Transmitter device 2 may be configured to modulate the second group of one or more signals according to a second adjusted beacon interval that is based at least in part on an amount of time between the second beacon of the second plurality of beacons and a third beacon of the second plurality of beacons, the second beacon and the third beacon of the second plurality of beacons being temporally consecutive beacons in the second plurality of beacons, and the second adjusted beacon interval being different than the second reference beacon interval. The second message may be based at least in part on the second adjusted beacon interval.

In some examples, in outputting the one or more signals, wireless interface 8 of transmitter device 2 may broadcast, according to the first wireless protocol, the one or more signals over a first channel of the first wireless protocol. The first channel of the wireless protocol may be associated with a first frequency range. Further, a plurality of channels of the second wireless protocol may be associated with a second frequency range, such that the first frequency range at least partially overlaps with the second frequency range.

In other examples, in outputting the one or more signals, wireless interface 8 of transmitter device 2 may broadcast, according to the first wireless protocol, the one or more signals over a first channel of the first wireless protocol. The first channel of the wireless protocol may be associated with a first frequency range. Further, a second channel of the second wireless protocol may be associated with a second frequency range, and a third channel of a third wireless protocol may be associated with a third frequency range. The third wireless protocol may be different than each of the first wireless protocol and the second wireless protocol. In such examples, the first frequency range may at least partially overlap with each of the second frequency range and the third frequency range.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Example 1

A system comprising: a first computing device configured to: determine a message to be broadcast; and output one or more signals according to a first wireless protocol, the first computing device being configured to output the one or more signals according to a first wireless protocol, and the second computing device being configured to process the one or more signals according to a second wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval and a second computing device configured to: receive the one or more signals according to the second wireless protocol; determine the reference beacon interval; determine the adjusted beacon interval; and determine the message based at least in part on the adjusted beacon interval.

Example 1b

The system of example 1, wherein the first computing device is further configured to perform any of the methods of examples 2-12, and wherein the second computing device is further configured to perform any of the methods of examples 13-24.

Example 2

A method comprising: determining, by a first computing device, a message to be sent to a second computing device; and outputting, by the first computing device, one or more signals, the first computing device being configured to output the one or more signals according to a first wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the first computing device is configured to modulate the one or more signals according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval.

Example 3

The method of example 2, wherein the message includes information regarding at least one of the following: an owner of the first computing device; a model of the first computing device; one or more modules to be activated in the second computing device; a desired configuration for the second computing device; or a security level of the first computing device.

Example 4

The method of any of examples 2-3, wherein the second computing device being configured to process the one or more signals according to a second wireless protocol, and wherein the first wireless protocol and the second wireless protocol are different wireless protocols.

Example 5

The method of any of examples 2-4, wherein the message being based at least in part on the adjusted beacon interval comprises the message based being at least in part on a difference between the adjusted beacon interval and the reference beacon interval.

Example 6

The method of example 5, wherein the first beacon and the second beacon are temporally consecutive beacons in the plurality of beacons, wherein the first computing device synchronizes with the second computing device based at least in part on the reference beacon interval.

Example 7

The method of any of examples 2-4, wherein the message being based at least in part on the adjusted beacon interval comprises the message being based only on a magnitude of the adjusted beacon interval.

Example 8

The method of example 7, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

Example 9

The method of any of examples 2-8, wherein outputting the one or more signals comprises broadcasting, by the first computing device and according to the first wireless protocol, the one or more signals over a first channel of the first wireless protocol, wherein the first channel of the first wireless protocol is associated with a first frequency range, wherein a plurality of channels of a second wireless protocol is associated with a second frequency range, wherein the second wireless protocol is different than the first wireless protocol, and wherein the first frequency range at least partially overlaps with the second frequency range.

Example 10

The method of any of examples 2-9, wherein outputting the one or more signals comprises broadcasting, by the first computing device and according to the first wireless protocol, the one or more signals over a first channel of the first wireless protocol, wherein the first channel of the first wireless protocol is associated with a first frequency range, wherein a second channel of the second wireless protocol is associated with a second frequency range, wherein a third channel of a third wireless protocol is associated with a third frequency range, and wherein the first frequency range at least partially overlaps with each of the second frequency range and the third frequency range, wherein the third wireless protocol is different than each of the first wireless protocol and the second wireless protocol.

Example 11

The method of any of examples 2-10, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, the method further comprising: determining, by the first computing device, a second message to be sent to a third computing device; and outputting, by the first computing device, a second group of one or more signals, the first computing device being configured to output the second group of one or more signals according to the first wireless protocol, wherein the second group of one or more signals comprise a second plurality of beacons that are associated with a second reference beacon interval, the second reference beacon interval being based at least in part on an amount of time between a first beacon of the second plurality of beacons and a second beacon of the second plurality of beacons, wherein the second reference beacon interval is different than the first reference beacon interval, wherein the first computing device is configured to modulate the second group of one or more signals according to a second adjusted beacon interval that is based at least in part on an amount of time between the second beacon of the second plurality of beacons and a third beacon of the second plurality of beacons, the second beacon and the third beacon of the second plurality of beacons being temporally consecutive beacons in the second plurality of beacons, and the second adjusted beacon interval being different than the second reference beacon interval, and wherein the second message is based at least in part on the second adjusted beacon interval.

Example 12

The method of any of examples 2-11, wherein the first network protocol comprises one of a WiFi® wireless protocol, a Zigbee® wireless protocol, or a Bluetooth® wireless protocol, wherein the second computing device being configured to process the one or more signals according to a second wireless protocol, and wherein the second network protocol comprises a different one of the WiFi® wireless protocol, the Zigbee® wireless protocol, or the Bluetooth® wireless protocol.

Example 13

A method comprising: receiving, by a first computing device, one or more signals that are output by a second computing device, wherein the first computing device is configured to process the one or more signals according to a first wireless protocol, and wherein the one or more signals are associated with a second wireless protocol; determining, by the first computing device, a reference beacon interval associated with a plurality of beacons identified in the one or more signals, wherein the reference beacon interval is based at least in part on an amount of time between a first beacon of the plurality of beacons and a second beacon of the plurality of beacons; determining, by the first computing device, an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval; and determining, by the first computing device, a message that is based at least in part on the adjusted beacon interval.

Example 14

The method of example 13, wherein determining the reference beacon interval comprises: determining, by the first computing device, a received signal strength model for the one or more signals, wherein the received signal strength model is a function of a received signal strength of the one or more signals over a period of time; determining, by the first computing device, one or more peaks in the received signal strength model; and determining, by the first computing device, the reference beacon interval based at least in part on a pattern of the one or more peaks, wherein a first of the one or more peaks is associated with the first beacon, and wherein a second of the one or more peaks is associated with the second beacon.

Example 15

The method of any of examples 13-14, further comprising determining a position of the first beacon, wherein determining the position of the first beacon comprises: determining, by the first computing device, a received signal strength model for the one or more signals, wherein the received signal strength model is a function of a received signal strength of the one or more signals over a first period of time; dividing, by the first computing device, the received signal strength model into a plurality of segments, wherein each segment of the plurality of segments comprises a portion of the received signal strength model over a second period of time, wherein the second period of time is equal to the reference beacon interval; determining, by the first computing device, a plurality of positions within each segment of the plurality of segments, wherein each segment has a number of positions equal to a magnitude of the reference beacon interval; assigning, by the first computing device, a value of 1 to each position of the plurality of positions within each segment of the plurality of segments with a respective received signal strength above a received signal strength threshold; assigning, by the first computing device, a value of 0 to each position of the plurality of positions within each segment of the plurality of segments with a respective received signal strength below the received signal strength threshold; determining, by the first computing device, a plurality of sums, wherein each sum of the plurality of sums comprises a respective value from one position from each segment of the plurality of segments; and determining, by the first computing device, the position of the first beacon based at least in part on a maximum sum of the plurality of sums.

Example 16

The method of any of examples 13-15, wherein the message includes information regarding at least one of the following: an owner of the second computing device; a model of the second computing device; one or more modules to be activated in the first computing device; a desired configuration for the first computing device; or a security level of the second computing device.

Example 17

The method of any of examples 13-16, wherein the first computing device is not configured to process the one or more signals according to the second wireless protocol.

Example 18

The method of any of examples 13-17, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, the method further comprising: receiving, by the first computing device, a second group of one or more signals that are output by a third computing device, wherein the third computing device is configured to output the second group of one or more signals according to the second wireless protocol; determining, by the first computing device, a second reference beacon interval associated with a second plurality of beacons identified in the second group of one or more signals output by the third computing device, wherein the second reference beacon interval is based at least in part on an amount of time between a first beacon of the second plurality of beacons and a second beacon of the second plurality of beacons, and wherein the second reference beacon interval is different than the first reference beacon interval; determining, by the first computing device, whether to receive a second message from the second computing device or to receive the second message from the third computing device; in response to determining to receive the second message from the second computing device: determining, by the first computing device, a second adjusted beacon interval, wherein the second adjusted beacon interval is based at least in part on an amount of time between a fourth beacon of the plurality of beacons output by the second computing device and a fifth beacon of the plurality of beacons output by the second computing device, wherein the fourth beacon and the fifth beacon of the plurality of beacons are temporally consecutive beacons in the plurality of beacons, and wherein the second adjusted beacon interval is different than the second reference beacon interval; and determining, by the first computing device, the second message based at least in part on the second adjusted beacon interval; and in response to determining to receive the message from the third computing device; determining, by the first computing device, a third adjusted beacon interval, wherein the third adjusted beacon interval is based at least in part on an amount of time between the second beacon of the second plurality and a third beacon of the second plurality of beacons, wherein the second beacon and the third beacon of the second plurality of beacons are temporally consecutive beacons in the second plurality of beacons, and wherein the third adjusted beacon interval is different than the second reference beacon interval; and determining, by the first computing device, the second message based at least in part on the third adjusted beacon interval.

Example 19

The method of any of examples 13-18, wherein the first wireless protocol and the second wireless protocol are different wireless protocols.

Example 20

The method of any of examples 13-19, wherein determining the message based at least in part on the adjusted beacon interval comprises determining the message based at least in part on a difference between the adjusted beacon interval and the reference beacon interval.

Example 21

The method of example 20, wherein the first beacon and the second beacon are temporally consecutive beacons in the plurality of beacons, and wherein the first computing device synchronizes with the second computing device based at least in part on the reference beacon interval.

Example 22

The method of any of examples 13-19, wherein determining the message based at least in part on the adjusted beacon interval comprises determining the message based only on a magnitude of the adjusted beacon interval.

Example 23

The method of example 22, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

Example 24

The method of any of examples 13-23, wherein the first network protocol comprises one of a WiFi® wireless protocol, a Zigbee® wireless protocol, or a Bluetooth® wireless protocol, and wherein the second network protocol comprises a different one of the WiFi® wireless protocol, the Zigbee® wireless protocol, or the Bluetooth® wireless protocol.

Example 25

A computing device comprising: a wireless radio configured to send and receive signals via a first wireless protocol; at least one processor; and a storage device configured to store one or more modules operable by the at least one processor to: determine a message to be sent to a second computing device; and output one or more signals via the wireless radio and according to the first wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons, wherein the one or more modules are further operable by the at least one processor to modulate the one or more signals using the wireless radio according to an adjusted beacon interval that is based at least in part on an amount of time between the second beacon of the plurality of beacons and a third beacon of the plurality of beacons, the second beacon and the third beacon being temporally consecutive beacons in the plurality of beacons, and the adjusted beacon interval being different than the reference beacon interval, and wherein the message is based at least in part on the adjusted beacon interval.

Example 26

The computing device of example 25, wherein the second computing device being configured to process the one or more signals according to a second wireless protocol, and wherein the first wireless protocol and the second wireless protocol are different wireless protocols.

Example 27

The computing device of any of examples 25-26, wherein the message being based at least in part on the adjusted beacon interval comprises the message based being at least in part on a difference between the adjusted beacon interval and the reference beacon interval, wherein the first beacon and the second beacon are temporally consecutive beacons in the plurality of beacons, and wherein the computing device synchronizes with the second computing device based at least in part on the reference beacon interval.

Example 28

The computing device of any of examples 25-26, wherein the message being based at least in part on the adjusted beacon interval comprises the message being based only on a magnitude of the adjusted beacon interval, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

Example 29

The computing device of any of examples 25-28, wherein the one or more modules being operable by the at least one processor to output the one or more signals comprises the one or more modules being operable by the at least one processor to broadcast, via the wireless radio and according to the first wireless protocol, the one or more signals over a first channel of the first wireless protocol, wherein the first channel of the first wireless protocol is associated with a first frequency range, wherein a plurality of channels of a second wireless protocol is associated with a second frequency range, wherein the second wireless protocol is different than the first wireless protocol, and wherein the first frequency range at least partially overlaps with the second frequency range.

Example 30

The computing device of any of examples 25-29, wherein the one or more modules being operable by the at least one processor to output the one or more signals comprises the one or more modules being operable by the at least one processor to broadcast, via the wireless radio and according to the first wireless protocol, the one or more signals over a first channel of the first wireless protocol, wherein the first channel of the first wireless protocol is associated with a first frequency range, wherein a second channel of the second wireless protocol is associated with a second frequency range, wherein a third channel of a third wireless protocol is associated with a third frequency range, and wherein the first frequency range at least partially overlaps with each of the second frequency range and the third frequency range, wherein the third wireless protocol is different than each of the first wireless protocol and the second wireless protocol.

Example 31

The computing device of any of examples 25-30, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, wherein the one or more modules are further operable by the at least one processor to: determine a second message to be sent to a third computing device; and output, via the wireless radio, a second group of one or more signals according to the first wireless protocol, wherein the second group of one or more signals comprise a second plurality of beacons that are associated with a second reference beacon interval, the second reference beacon interval being based at least in part on an amount of time between a first beacon of the second plurality of beacons and a second beacon of the second plurality of beacons, wherein the second reference beacon interval is different than the first reference beacon interval, wherein the one or more modules are further operable by the at least one processor to modulate, using the wireless radio, the second group of one or more signals according to a second adjusted beacon interval that is based at least in part on an amount of time between the second beacon of the second plurality of beacons and a third beacon of the second plurality of beacons, the second beacon and the third beacon of the second plurality of beacons being temporally consecutive beacons in the second plurality of beacons, and the second adjusted beacon interval being different than the second reference beacon interval, and wherein the second message is based at least in part on the second adjusted beacon interval.

Example 32

A computing device comprising: a wireless radio configured to send and receive signals via a first wireless protocol; at least one processor; and a storage device configured to store one or more modules operable by the at least one processor to: receive, using the wireless radio, one or more signals that are output by a second computing device, wherein the first computing device is configured to process the one or more signals according to the first wireless protocol, and wherein the one or more signals are associated with a second wireless protocol; determine a reference beacon interval associated with a plurality of beacons identified in the one or more signals, wherein the reference beacon interval is based at least in part on an amount of time between a first beacon of the plurality of beacons and a second beacon of the plurality of beacons; determine an adjusted beacon interval, wherein the adjusted beacon interval is based at least in part on an amount of time between the second beacon of the plurality of beacons and a third beacon of the plurality of beacons, wherein the second beacon and the third beacon are temporally consecutive beacons in the plurality of beacons, and wherein the adjusted beacon interval is different than the reference beacon interval; and determine a message that is based at least in part on the adjusted beacon interval.

Example 33

The computing device of example 32, wherein the one or more modules being operable by the at least one processor to determine the reference beacon interval comprises the one or more modules being operable by the at least one processor to: determine a received signal strength model for the one or more signals, wherein the received signal strength model is a function of a received signal strength of the one or more signals over a period of time; determine one or more peaks in the received signal strength model; and determine the reference beacon interval based at least in part on a pattern of the one or more peaks, wherein a first of the one or more peaks is associated with the first beacon, and wherein a second of the one or more peaks is associated with the second beacon.

Example 34

The computing device of any of examples 32-33, wherein the one or more modules are further operable by the at least one processor to determine a position of the first beacon, wherein the one or more modules being operable by the at least one processor to determine the position of the first beacon comprises the one or more modules being operable by the at least one processor to: determine a received signal strength model for the one or more signals, wherein the received signal strength model is a function of a received signal strength of the one or more signals over a first period of time; divide the received signal strength model into a plurality of segments, wherein each segment of the plurality of segments comprises a portion of the received signal strength model over a second period of time, wherein the second period of time is equal to the reference beacon interval; determine a plurality of positions within each segment of the plurality of segments, wherein each segment has a number of positions equal to a magnitude of the reference beacon interval; assign a value of 1 to each position of the plurality of positions within each segment of the plurality of segments with a respective received signal strength above a received signal strength threshold; assign a value of 0 to each position of the plurality of positions within each segment of the plurality of segments with a respective received signal strength below the received signal strength threshold; determine a plurality of sums, wherein each sum of the plurality of sums comprises a respective value from one position from each segment of the plurality of segments; and determine the position of the first beacon based at least in part on a maximum sum of the plurality of sums.

Example 35

The computing device of any of examples 32-34, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, wherein the one or more modules are further operable by the at least one processor to: receive, using the wireless radio, a second group of one or more signals that are output by a third computing device, wherein the third computing device is configured to output the second group of one or more signals according to the second wireless protocol; determine a second reference beacon interval associated with a second plurality of beacons identified in the second group of one or more signals output by the third computing device, wherein the second reference beacon interval is based at least in part on an amount of time between a first beacon of the second plurality of beacons and a second beacon of the second plurality of beacons, and wherein the second reference beacon interval is different than the first reference beacon interval; determine whether to receive a second message from the second computing device or to receive the second message from the third computing device; in response to determining to receive the second message from the second computing device: determine a second adjusted beacon interval, wherein the second adjusted beacon interval is based at least in part on an amount of time between a fourth beacon of the plurality of beacons output by the second computing device and a fifth beacon of the plurality of beacons output by the second computing device, wherein the fourth beacon and the fifth beacon of the plurality of beacons are temporally consecutive beacons in the plurality of beacons, and wherein the second adjusted beacon interval is different than the second reference beacon interval; and determine the second message based at least in part on the second adjusted beacon interval; and in response to determining to receive the message from the third computing device; determine a third adjusted beacon interval, wherein the third adjusted beacon interval is based at least in part on an amount of time between the second beacon of the second plurality and a third beacon of the second plurality of beacons, wherein the second beacon and the third beacon of the second plurality of beacons are temporally consecutive beacons in the second plurality of beacons, and wherein the third adjusted beacon interval is different than the second reference beacon interval; and determine the second message based at least in part on the third adjusted beacon interval.

Example 36

The computing device of any of examples 32-35, wherein the one or more modules being operable by the at least one processor to determine the message based at least in part on the adjusted beacon interval comprises the one or more modules being operable by the at least one processor to determine the message based at least in part on a difference between the adjusted beacon interval and the reference beacon interval, wherein the first beacon and the second beacon are temporally consecutive beacons in the plurality of beacons, and wherein the computing device synchronizes with the second computing device based at least in part on the reference beacon interval.

Example 37

The computing device of any of examples 32-35, wherein the one or more modules being operable by the at least one processor to determine the message based at least in part on the adjusted beacon interval comprises the one or more modules being operable by the at least one processor to determine the message based only on a magnitude of the adjusted beacon interval, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

Example 38

An apparatus comprising means for performing any combination of the methods of examples 2-24.

Example 39

A computer-readable storage medium having stored thereon instructions that, when executed, cause one or more processors of a video coding device to perform any combination of the methods of examples 2-24.

Example 40

A system configured to perform any combination of the methods of examples 2-24.

Example 41

A computing device configured to perform any combination of the methods of examples 2-24.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A system comprising:
 a first computing device and a second computing device, wherein the first computing device is configured to:
  determine a message to be broadcast;
  output one or more signals according to a first wireless protocol, the first computing device being configured to output the one or more signals according to a first wireless protocol, and the second computing device being configured to process the one or more signals according to a second wireless protocol, wherein the one or more signals comprise a plurality of beacons that are associated with a reference beacon interval, the reference beacon interval being based at least in part on an amount of time between a first beacon of the plurality of beacons and a second beacon of the plurality of beacons;
  while outputting the one or more signals, modulate the one or more signals according to an adjusted beacon interval such that an amount of time between the second beacon of the plurality of beacons and a third beacon of the plurality of beacons is equal to the adjusted beacon interval, the second beacon and the third beacon being temporally consecutive beacons in the plurality of beacons, wherein the adjusted beacon interval is different than the reference beacon interval, and wherein the adjusted beacon interval is dependent on and indicative of the message, and
 wherein the second computing device is configured to:
  receive the one or more signals according to the second wireless protocol;
  determine the reference beacon interval between the first beacon and the second beacon of the plurality of beacons;
  determine the adjusted beacon interval between the second beacon and the third beacon of the plurality of beacons; and
  derive the message from the adjusted beacon interval.

2. A method comprising:
 determining, by a first computing device, a message to be sent to a second computing device;
 outputting, by the first computing device, one or more signals, the first computing device being configured to output the one or more signals according to a first wireless protocol, wherein the one or more signals comprise a plurality of beacons that are associated with a reference beacon interval, the reference beacon interval being equal to an amount of time between a first beacon of the plurality of beacons and a second beacon of the plurality of beacons, wherein the second computing device is configured to process the one or more signals according to a second wireless protocol, and wherein the first wireless protocol and the second wireless protocol are different wireless protocols;
 while outputting the one or more signals, modulating, by the first computing device, the one or more signals according to an adjusted beacon interval such that an amount of time between the second beacon of the plurality of beacons and a third beacon of the plurality of beacons is equal to the adjusted beacon interval, the second beacon and the third beacon being temporally consecutive beacons in the plurality of beacons, wherein the adjusted beacon interval is different than the reference beacon interval, and wherein the adjusted beacon interval is dependent on and indicative of the message.

3. The method of claim 2, wherein the message includes information regarding at least one of the following:
 an owner of the first computing device;
 a model of the first computing device;
 one or more modules to be activated in the second computing device;
 a desired configuration for the second computing device; or
 a security level of the first computing device.

4. The method of claim 2, wherein the adjusted beacon interval dependent on the message comprises the message being based at least in part on a difference between the adjusted beacon interval and the reference beacon interval.

5. The method of claim 4, wherein the first beacon and the second beacon are temporally consecutive beacons in the plurality of beacons, and wherein the first computing device synchronizes with the second computing device based at least in part on the reference beacon interval.

6. The method of claim 2, wherein the adjusted beacon interval dependent on the message comprises the message being based only on a magnitude of the adjusted beacon interval.

7. The method of claim 6, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

8. The method of claim 2, wherein outputting the one or more signals comprises broadcasting, by the first computing device and according to the first wireless protocol, the one or more signals over a first channel of the first wireless protocol, wherein the first channel of the first wireless protocol is associated with a first frequency range, wherein a plurality of channels of the second wireless protocol is associated with a second frequency range, and wherein the first frequency range at least partially overlaps with the second frequency range.

9. The method of claim 2, wherein outputting the one or more signals comprises broadcasting, by the first computing device and according to the first wireless protocol, the one or more signals over a first channel of the first wireless protocol, wherein the first channel of the first wireless protocol is associated with a first frequency range, wherein a second channel of the second wireless protocol is associated with a second frequency range, wherein a third channel of a third wireless protocol is associated with a third frequency range, and wherein the first frequency range at least partially overlaps with each of the second frequency range and the third frequency range, wherein the third wireless protocol is different than each of the first wireless protocol and the second wireless protocol.

10. The method of claim 2, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, the method further comprising:
determining, by the first computing device, a second message to be sent to a third computing device;
outputting, by the first computing device, a second group of one or more signals, the first computing device being configured to output the second group of one or more signals according to the first wireless protocol, wherein the second group of one or more signals comprise a second plurality of beacons that are associated with a second reference beacon interval, the second reference beacon interval being equal to an amount of time between a first beacon of the second plurality of beacons and a second beacon of the second plurality of beacons, wherein the second reference beacon interval is different than the first reference beacon interval; and
while outputting the second group of one or more signals, modulating, by the first computing device, the second group of one or more signals according to a second adjusted beacon interval such that an amount of time between the second beacon of the second plurality of beacons and a third beacon of the second plurality of beacons is equal to the second adjusted beacon interval, the second beacon and the third beacon of the second plurality of beacons being temporally consecutive beacons in the second plurality of beacons, and the second adjusted beacon interval being different than the second reference beacon interval, and wherein the second adjusted beacon interval is dependent on and indicative of the second message.

11. The method of claim 2, wherein the first network protocol comprises one of a WiFi® wireless protocol, a Zigbee® wireless protocol, or a Bluetooth® wireless protocol, wherein the second computing device being configured to process the one or more signals according to the second wireless protocol, and wherein the second network protocol comprises a different one of the WiFi® wireless protocol, the Zigbee® wireless protocol, or the Bluetooth® wireless protocol.

12. A method comprising:
receiving, by a first computing device, one or more signals that are output by a second computing device, wherein the first computing device is configured to process the one or more signals according to a first wireless protocol, and wherein the one or more signals are output according to a second wireless protocol;
determining, by the first computing device, a reference beacon interval associated with a plurality of beacons identified in the one or more signals, wherein the reference beacon interval is equal to an amount of time between a first beacon of the plurality of beacons and a second beacon of the plurality of beacons;
determining, by the first computing device, an adjusted beacon interval, wherein the adjusted beacon interval is equal to an amount of time between the second beacon of the plurality of beacons and a third beacon of the plurality of beacons, wherein the second beacon and the third beacon are temporally consecutive beacons in the plurality of beacons, wherein the adjusted beacon interval is different than the reference beacon interval, and wherein the adjusted beacon interval is dependent on and indicative of a message output by the second computing device; and
deriving, by the first computing device, the message from the adjusted beacon interval.

13. The method of claim 12, wherein determining the reference beacon interval comprises:
determining, by the first computing device, a received signal strength model for the one or more signals, wherein the received signal strength model is a function of a received signal strength of the one or more signals over a period of time;
determining, by the first computing device, one or more peaks in the received signal strength model; and
determining, by the first computing device, the reference beacon interval based at least in part on a pattern of the one or more peaks, wherein a first of the one or more peaks is associated with the first beacon, and wherein a second of the one or more peaks is associated with the second beacon.

14. The method of claim 12, further comprising determining a position of the first beacon, wherein determining the position of the first beacon comprises:
determining, by the first computing device, a received signal strength model for the one or more signals, wherein the received signal strength model is a function of a received signal strength of the one or more signals over a first period of time;
dividing, by the first computing device, the received signal strength model into a plurality of segments, wherein each segment of the plurality of segments comprises a portion of the received signal strength model over a second period of time, wherein the second period of time is equal to the reference beacon interval;
determining, by the first computing device, a plurality of positions within each segment of the plurality of segments, wherein each segment has a number of positions equal to a magnitude of the reference beacon interval;
assigning, by the first computing device, a value of 1 to each position of the plurality of positions within each segment of the plurality of segments with a respective received signal strength above a received signal strength threshold;
assigning, by the first computing device, a value of 0 to each position of the plurality of positions within each segment of the plurality of segments with a respective received signal strength below the received signal strength threshold;
determining, by the first computing device, a plurality of sums, wherein each sum of the plurality of sums comprises a respective value from one position from each segment of the plurality of segments; and determining, by the first computing device, the position of the first beacon based at least in part on a maximum sum of the plurality of sums.

15. The method of claim 12, wherein the message includes information regarding at least one of the following:
an owner of the second computing device;
a model of the second computing device;
one or more modules to be activated in the first computing device;
a desired configuration for the first computing device; or
a security level of the second computing device.

16. The method of claim 12, wherein the first computing device is not configured to process the one or more signals according to the second wireless protocol.

17. The method of claim 12, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, the method further comprising:
receiving, by the first computing device, a second group of one or more signals that are output by a third computing device, wherein the third computing device is configured to output the second group of one or more signals according to the second wireless protocol;
determining, by the first computing device, a second reference beacon interval associated with a second plurality of beacons identified in the second group of one or more signals output by the third computing device, wherein the second reference beacon interval is equal to an amount of time between a first beacon of the second plurality of beacons and a second beacon of the second plurality of beacons, wherein the second reference beacon interval is different than the first reference beacon interval;
determining, by the first computing device, whether to receive a second message from the second computing device or to receive a message from the third computing device;
in response to determining to receive the second message from the second computing device:
determining, by the first computing device, a second adjusted beacon interval, wherein the second adjusted beacon interval is equal to an amount of time between a fourth beacon of the plurality of beacons output by the second computing device and a fifth beacon of the plurality of beacons output by the second computing device, wherein the fourth beacon and the fifth beacon of the plurality of beacons are temporally consecutive beacons in the plurality of beacons, wherein the second adjusted beacon interval is different than the second reference beacon interval, and wherein the second adjusted beacon interval is dependent on and indicative of the second message output by the third computing device; and
determining, by the first computing device, the second message from the second adjusted beacon interval; and
in response to determining to receive the message from the third computing device;
determining, by the first computing device, a third adjusted beacon interval, wherein the third adjusted beacon interval is equal to an amount of time between the second beacon of the second plurality and a third beacon of the second plurality of beacons, wherein the second beacon and the third beacon of the second plurality of beacons are temporally consecutive beacons in the second plurality of beacons, wherein the third adjusted beacon interval is different than the second reference beacon interval, and wherein the third adjusted beacon interval is dependent on and indicative of the second message output by the third computing device; and
determining, by the first computing device, the message from the third computing device from the third adjusted beacon interval.

18. The method of claim 12, wherein the first wireless protocol and the second wireless protocol are different wireless protocols.

19. The method of claim 12, wherein determining the message from the adjusted beacon interval comprises determining the message based at least in part on a difference between the adjusted beacon interval and the reference beacon interval.

20. The method of claim 19, wherein the first beacon and the second beacon are temporally consecutive beacons in the plurality of beacons, and wherein the first computing device synchronizes with the second computing device based at least in part on the reference beacon interval.

21. The method of claim 12, wherein determining the message from the adjusted beacon interval comprises determining the message based only on a magnitude of the adjusted beacon interval.

22. The method of claim 21, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

23. The method of claim 12, wherein the first network protocol comprises one of a WiFi® wireless protocol, a Zigbee® wireless protocol, or a Bluetooth® wireless protocol, and wherein the second network protocol comprises a different one of the WiFi® wireless protocol, the Zigbee® wireless protocol, or the Bluetooth® wireless protocol.

24. A computing device comprising:
a wireless radio configured to send and receive signals via a first wireless protocol;
at least one processor; and
a storage device configured to store one or more modules operable by the at least one processor to:
determine a message to be broadcast;
output one or more signals according to a first wireless protocol, the first computing device being configured to output the one or more signals according to a first wireless protocol, and the second computing device being configured to process the one or more signals according to a second wireless protocol, wherein the first wireless protocol and the second wireless protocol are different wireless protocols, wherein the one or more signals comprise a plurality of beacons that are associated with a reference beacon interval, the reference beacon interval being based at least in part on equal to an amount of time between a first beacon of the plurality of beacons and a second beacon of the plurality of beacons;
while outputting the one or more signals, modulate the one or more signals according to an adjusted beacon interval such that an amount of time between the second beacon of the plurality of beacons and a third beacon of the plurality of beacons is equal to the adjusted beacon interval, the second beacon and the third beacon being temporally consecutive beacons in the plurality of beacons, wherein the adjusted beacon interval is different than the reference beacon interval, and wherein the adjusted beacon interval is dependent on and indicative of the message.

25. The computing device of claim 24, wherein the adjusted beacon interval dependent on the message comprises the message being based at least in part on a difference between the adjusted beacon interval and the reference beacon interval, wherein the first beacon and the second beacon are temporally consecutive beacons in the plurality of beacons, and wherein the computing device synchronizes with the second computing device based at least in part on the reference beacon interval.

26. The computing device of claim 24, wherein the adjusted beacon interval dependent on the message comprises the message being based only on a magnitude of the adjusted beacon interval, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

27. The computing device of claim 24, wherein the one or more modules being operable by the at least one processor to output the one or more signals comprises the one or more modules being operable by the at least one processor to broadcast, via the wireless radio and according to the first wireless protocol, the one or more signals over a first channel of the first wireless protocol, wherein the first channel of the first wireless protocol is associated with a first frequency range, wherein a plurality of channels of the second wireless protocol is associated with a second frequency range, wherein the second wireless protocol is different than the first wireless protocol, and wherein the first frequency range at least partially overlaps with the second frequency range.

28. The computing device of claim 24, wherein the one or more modules being operable by the at least one processor to output the one or more signals comprises the one or more modules being operable by the at least one processor to broadcast, via the wireless radio and according to the first wireless protocol, the one or more signals over a first channel of the first wireless protocol, wherein the first channel of the first wireless protocol is associated with a first frequency range, wherein a second channel of the second wireless protocol is associated with a second frequency range, wherein a third channel of a third wireless protocol is associated with a third frequency range, and wherein the first frequency range at least partially overlaps with each of the second frequency range and the third frequency range, wherein the third wireless protocol is different than each of the first wireless protocol and the second wireless protocol.

29. The computing device of claim 24, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, wherein the one or more modules are further operable by the at least one processor to:
determine a second message to be sent to a third computing device;

output, via the wireless radio, a second group of one or more signals according to the first wireless protocol, wherein the second group of one or more signals comprise a second plurality of beacons that are associated with a second reference beacon interval, the second reference beacon interval being equal to an amount of time between a first beacon of the second plurality of beacons and a second beacon of the second plurality of beacons, wherein the second reference beacon interval is different than the first reference beacon interval; and while outputting the second group of one or more signals, modulate, using the wireless radio, the second group of one or more signals according to a second adjusted beacon interval such that an amount of time between the second beacon of the second plurality of beacons and a third beacon of the second plurality of beacons is equal to the second adjusted beacon interval, the second beacon and the third beacon of the second plurality of beacons being temporally consecutive beacons in the second plurality of beacons, and the second adjusted beacon interval being different than the second reference beacon interval, and wherein the second adjusted beacon interval is dependent on and indicative of the second message.

30. A computing device comprising:
a wireless radio configured to send and receive signals via a first wireless protocol;
at least one processor; and
a storage device configured to store one or more modules operable by the at least one processor to:
receive, using the wireless radio, one or more signals that are output by a second computing device, wherein the first computing device is configured to process the one or more signals according to a first wireless protocol, and wherein the one or more signals are output according to a second wireless protocol;
determine a reference beacon interval associated with a plurality of beacons identified in the one or more signals, wherein the reference beacon interval is equal to an amount of time between a first beacon of the plurality of beacons and a second beacon of the plurality of beacons;
determine an adjusted beacon interval, wherein the adjusted beacon interval is equal to an amount of time between the second beacon of the plurality of beacons and a third beacon of the plurality of beacons, wherein the second beacon and the third beacon are temporally consecutive beacons in the plurality of beacons, wherein the adjusted beacon interval is different than the reference beacon interval, and wherein the adjusted beacon interval is dependent on and indicative of a message output by the second computing device; and
derive the message from the adjusted beacon interval.

31. The computing device of claim 30, wherein the one or more modules being operable by the at least one processor to determine the reference beacon interval comprises the one or more modules being operable by the at least one processor to:
determine a received signal strength model for the one or more signals, wherein the received signal strength model is a function of a received signal strength of the one or more signals over a period of time;
determine one or more peaks in the received signal strength model; and determine the reference beacon interval based at least in part on a pattern of the one or more peaks, wherein a first of the one or more peaks is associated with the first beacon, and wherein a second of the one or more peaks is associated with the second beacon.

32. The computing device of claim 30, wherein the one or more modules are further operable by the at least one processor to determine a position of the first beacon, wherein the one or more modules being operable by the at least one processor to determine the position of the first beacon comprises the one or more modules being operable by the at least one processor to:
  determine a received signal strength model for the one or more signals, wherein the received signal strength model is a function of a received signal strength of the one or more signals over a first period of time;
  divide the received signal strength model into a plurality of segments, wherein each segment of the plurality of segments comprises a portion of the received signal strength model over a second period of time, wherein the second period of time is equal to the reference beacon interval;
  determine a plurality of positions within each segment of the plurality of segments, wherein each segment has a number of positions equal to a magnitude of the reference beacon interval;
  assign a value of 1 to each position of the plurality of positions within each segment of the plurality of segments with a respective received signal strength above a received signal strength threshold;
  assign a value of 0 to each position of the plurality of positions within each segment of the plurality of segments with a respective received signal strength below the received signal strength threshold;
  determine a plurality of sums, wherein each sum of the plurality of sums comprises a respective value from one position from each segment of the plurality of segments; and
  determine the position of the first beacon based at least in part on a maximum sum of the plurality of sums.

33. The computing device of claim 30, wherein the message comprises a first message, wherein the one or more signals comprises a first group of one or more signals, wherein the plurality of beacons comprises a first plurality of beacons, wherein the reference beacon interval comprises a first reference beacon interval, and wherein the adjusted beacon interval comprises a first adjusted beacon interval, wherein the one or more modules are further operable by the at least one processor to:
  receive, using the wireless radio, a second group of one or more signals that are output by a third computing device, wherein the third computing device is configured to output the second group of one or more signals according to the second wireless protocol;
  determine a second reference beacon interval associated with a second plurality of beacons identified in the second group of one or more signals output by the third computing device, wherein the second reference beacon interval is equal to an amount of time between a first beacon of the second plurality of beacons and a second beacon of the second plurality of beacons, and wherein the second reference beacon interval is different than the first reference beacon interval;
  determine whether to receive a second message from the second computing device or to receive a message from the third computing device;
  in response to determining to receive the second message from the second computing device:
    determine a second adjusted beacon interval, wherein the second adjusted beacon interval is equal to an amount of time between a fourth beacon of the plurality of beacons output by the second computing device and a fifth beacon of the plurality of beacons output by the second computing device, wherein the fourth beacon and the fifth beacon of the plurality of beacons are temporally consecutive beacons in the plurality of beacons, wherein the second adjusted beacon interval is different than the second reference beacon interval, and wherein the second adjusted beacon interval is dependent on and indicative of the second message output by the third computing device; and
    determine the second message from the second adjusted beacon interval; and
  in response to determining to receive the message from the third computing device;
    determine a third adjusted beacon interval, wherein the third adjusted beacon interval is equal to an amount of time between the second beacon of the second plurality and a third beacon of the second plurality of beacons, wherein the second beacon and the third beacon of the second plurality of beacons are temporally consecutive beacons in the second plurality of beacons, wherein the third adjusted beacon interval is different than the second reference beacon interval, and wherein the third adjusted beacon interval is dependent on and indicative of the second message output by the third computing device; and
    determine the message from the third computing device from the third adjusted beacon interval.

34. The computing device of claim 30, wherein the one or more modules being operable by the at least one processor to determine the message from the adjusted beacon interval comprises the one or more modules being operable by the at least one processor to determine the message based at least in part on a difference between the adjusted beacon interval and the reference beacon interval, wherein the first beacon and the second beacon are temporally consecutive beacons in the plurality of beacons, and wherein the computing device synchronizes with the second computing device based at least in part on the reference beacon interval.

35. The computing device of claim 30, wherein the one or more modules being operable by the at least one processor to determine the message from the adjusted beacon interval comprises the one or more modules being operable by the at least one processor to determine the message based only on a magnitude of the adjusted beacon interval, wherein the first beacon is temporally consecutive with an intermediary beacon in the plurality of beacons, wherein the second beacon is also temporally consecutive with the intermediary beacon in the plurality of beacons, and wherein the intermediary beacon is the third beacon.

* * * * *